(12) United States Patent (10) Patent No.: US 12,676,503 B2
Cardona (45) Date of Patent: Jul. 7, 2026

(54) SMART ENERGY PLATFORMS AND METHODS FOR A PROPERTY

(71) Applicant: State Farm Mutual Automobile Insurance Company, Bloomington, IL (US)

(72) Inventor: Alexander Cardona, Gilbert, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 427 days.

(21) Appl. No.: 17/724,264

(22) Filed: Apr. 19, 2022

(65) Prior Publication Data

US 2023/0268766 A1     Aug. 24, 2023

Related U.S. Application Data

(60) Provisional application No. 63/311,754, filed on Feb. 18, 2022.

(51) Int. Cl.
| | |
|---|---|
| *H04L 12/28* | (2006.01) |
| *G06Q 50/06* | (2012.01) |
| *H02J 13/13* | (2026.01) |

(52) U.S. Cl.
CPC .............. *H02J 13/13* (2026.01); *G06Q 50/06* (2013.01); *H04L 12/2818* (2013.01); *H04L 2012/2847* (2013.01)

(58) Field of Classification Search
CPC .............. H02J 13/00006; G06Q 50/06; H04L 12/2818; H04L 2012/2847; H04L 12/2816
See application file for complete search history.

(56) References Cited

U.S. PATENT DOCUMENTS

| | | | |
|---|---|---|---|
| 5,483,153 A | 1/1996 | Leeb et al. | |
| 5,872,358 A | 2/1999 | Todokoro et al. | |

(Continued)

FOREIGN PATENT DOCUMENTS

| | | |
|---|---|---|
| AU | 2015100551 A4 | 5/2015 |
| CN | 110260927 A | 9/2019 |

(Continued)

OTHER PUBLICATIONS

Cui, Tiansong, et al. "An optimal energy co-scheduling framework for smart buildings." Integration 58 (2017): 528-537 (Year: 2017).*

(Continued)

*Primary Examiner* — Christopher E. Everett
(74) *Attorney, Agent, or Firm* — Armstrong Teasdale LLP

(57) ABSTRACT

A smart energy platform for controlling energy consumption at a property, the smart energy platform configured to: (i) receive an input from a user associated with the property indicating a maximum comfort temperature and a minimum comfort temperature of the property; (ii) receive property data; (iii) retrieve weather data; (iv) determine property usage; (v) receive energy pricing data from an energy company; (vi) build a model based upon the input from the user, the property data, the weather data, and the property usage; (vii) input the energy pricing data and the weather data into the model; (viii) output an energy schedule for the property to maintain a temperature of the property within the maximum comfort temperature and the minimum comfort temperature at a minimum cost to the user; and/or (ix) control the temperature of the property based upon the energy schedule for the property.

21 Claims, 9 Drawing Sheets

(56) References Cited

U.S. PATENT DOCUMENTS

| | | | |
|---|---|---|---|
| 5,900,629 | A | 5/1999 | Todokoro et al. |
| 6,069,356 | A | 5/2000 | Todokoro et al. |
| 6,084,238 | A | 7/2000 | Todokoro et al. |
| 6,762,686 | B1 | 7/2004 | Tabe |
| 6,853,894 | B1 | 2/2005 | Kolls |
| 6,982,710 | B2 | 1/2006 | Salomie |
| 6,988,026 | B2 | 1/2006 | Breed et al. |
| 7,082,359 | B2 | 7/2006 | Breed |
| 7,089,099 | B2 | 8/2006 | Shostak et al. |
| 7,103,460 | B1 | 9/2006 | Breed |
| RE40,073 | E | 2/2008 | Breed |
| 7,421,321 | B2 | 9/2008 | Breed et al. |
| 8,055,529 | B1 | 11/2011 | Jackson et al. |
| 8,289,160 | B1 | 10/2012 | Billman |
| 8,433,344 | B1 | 4/2013 | Virga |
| 8,490,006 | B1 | 7/2013 | Reeser et al. |
| 8,515,783 | B1 | 8/2013 | Weeks |
| 8,527,306 | B1 | 9/2013 | Reeser et al. |
| 8,533,144 | B1 | 9/2013 | Reeser et al. |
| 8,595,034 | B2 | 11/2013 | Bauer et al. |
| 8,595,130 | B2 | 11/2013 | Johnson et al. |
| 8,640,038 | B1 | 1/2014 | Reeser et al. |
| 8,665,084 | B2 | 3/2014 | Shapiro et al. |
| 8,674,544 | B2 | 3/2014 | Rada et al. |
| 8,674,831 | B1 | 3/2014 | Merrill et al. |
| 8,712,805 | B1 | 4/2014 | Ferries et al. |
| 8,799,029 | B2 | 8/2014 | Bodas |
| 8,890,680 | B2 | 11/2014 | Reeser et al. |
| 8,892,451 | B2 | 11/2014 | Everett et al. |
| 8,917,186 | B1 | 12/2014 | Grant |
| 8,976,937 | B2 | 3/2015 | Shapiro et al. |
| 9,049,168 | B2 | 6/2015 | Jacob et al. |
| 9,057,746 | B1 | 6/2015 | Houlette et al. |
| 9,117,349 | B2 | 8/2015 | Shapiro et al. |
| 9,142,119 | B1 | 9/2015 | Grant |
| 9,152,737 | B1 | 10/2015 | Micali et al. |
| 9,183,578 | B1 | 11/2015 | Reeser et al. |
| 9,202,363 | B1 | 12/2015 | Grant |
| 9,262,909 | B1 | 2/2016 | Grant |
| 9,280,793 | B2 | 3/2016 | English et al. |
| 9,286,772 | B2 | 3/2016 | Shapiro et al. |
| 9,311,676 | B2 | 4/2016 | Helitzer et al. |
| 9,344,330 | B2 | 5/2016 | Jacob et al. |
| 9,424,737 | B2 | 8/2016 | Bailey et al. |
| 9,443,195 | B2 | 9/2016 | Micali et al. |
| 9,472,092 | B1 | 10/2016 | Grant |
| 9,552,611 | B2 | 1/2017 | Cook |
| 9,589,441 | B2 | 3/2017 | Shapiro et al. |
| 9,609,003 | B1 | 3/2017 | Chmielewski et al. |
| 9,665,892 | B1 | 5/2017 | Reeser et al. |
| 9,666,060 | B2 | 5/2017 | Reeser et al. |
| 9,699,529 | B1 | 7/2017 | Petri et al. |
| 9,739,813 | B2 | 8/2017 | Houlette et al. |
| 9,786,158 | B2 | 10/2017 | Beaver et al. |
| 9,798,979 | B2 | 10/2017 | Fadell et al. |
| 9,798,993 | B2 | 10/2017 | Payne et al. |
| 9,800,570 | B1 | 10/2017 | Bleisch |
| 9,800,958 | B1 | 10/2017 | Petri et al. |
| 9,812,001 | B1 | 11/2017 | Grant |
| 9,818,158 | B1 | 11/2017 | Devereaux et al. |
| 9,824,398 | B2 | 11/2017 | English et al. |
| 9,888,371 | B1 | 2/2018 | Jacob |
| 9,892,463 | B1 | 2/2018 | Hakimi-Boushehri et al. |
| 9,898,168 | B2 | 2/2018 | Shapiro et al. |
| 9,898,912 | B1 | 2/2018 | Jordan, II et al. |
| 9,911,042 | B1 | 3/2018 | Cardona et al. |
| 9,923,971 | B2 | 3/2018 | Madey et al. |
| 9,942,630 | B1 | 4/2018 | Petri et al. |
| 9,947,051 | B1 | 4/2018 | Allen et al. |
| 9,947,202 | B1 | 4/2018 | Moon et al. |
| 9,978,033 | B1 | 5/2018 | Payne et al. |
| 9,997,056 | B2 | 6/2018 | Bleisch |
| 10,002,295 | B1 | 6/2018 | Cardona et al. |
| 10,042,341 | B1 | 8/2018 | Jacob |
| 10,047,974 | B1 | 8/2018 | Riblet et al. |
| 10,055,793 | B1 | 8/2018 | Call et al. |
| 10,055,803 | B2 | 8/2018 | Orduna et al. |
| 10,057,664 | B1 | 8/2018 | Moon et al. |
| 10,062,118 | B1 | 8/2018 | Bernstein et al. |
| 10,073,929 | B2 | 9/2018 | Vaynriber et al. |
| 10,102,584 | B1 | 10/2018 | Devereaux et al. |
| 10,102,585 | B1 | 10/2018 | Bryant et al. |
| 10,107,708 | B1 | 10/2018 | Schick et al. |
| 10,142,394 | B2 | 11/2018 | Chmielewski et al. |
| 10,158,498 | B2 | 12/2018 | Brandman et al. |
| 10,176,705 | B1 | 1/2019 | Grant |
| 10,181,160 | B1 | 1/2019 | Hakimi-Boushehri et al. |
| 10,186,134 | B1 | 1/2019 | Moon et al. |
| 10,198,771 | B1 | 2/2019 | Madigan et al. |
| 10,210,498 | B1 | 2/2019 | Meyyappan et al. |
| 10,217,068 | B1 | 2/2019 | Davis et al. |
| 10,223,750 | B1 | 3/2019 | Loo et al. |
| 10,223,751 | B1 | 3/2019 | Hutchinson et al. |
| 10,229,394 | B1 | 3/2019 | Davis et al. |
| 10,244,294 | B1 | 3/2019 | Moon et al. |
| 10,249,158 | B1 | 4/2019 | Jordan, II et al. |
| 10,269,074 | B1 | 4/2019 | Patel et al. |
| 10,282,787 | B1 | 5/2019 | Hakimi-Boushehri et al. |
| 10,282,788 | B1 | 5/2019 | Jordan, II et al. |
| 10,282,961 | B1 | 5/2019 | Jordan, II et al. |
| 10,295,431 | B1 | 5/2019 | Schick et al. |
| 10,296,978 | B1 | 5/2019 | Corder et al. |
| 10,297,138 | B2 | 5/2019 | Reeser et al. |
| 10,304,313 | B1 | 5/2019 | Moon et al. |
| 10,311,521 | B1 | 6/2019 | Capone et al. |
| 10,323,860 | B1 | 6/2019 | Riblet et al. |
| 10,325,473 | B1 | 6/2019 | Moon et al. |
| 10,332,059 | B2 | 6/2019 | Matsuoka et al. |
| 10,346,811 | B1 | 7/2019 | Jordan, II et al. |
| 10,353,359 | B1 | 7/2019 | Jordan, II et al. |
| 10,356,303 | B1 | 7/2019 | Jordan, II et al. |
| 10,380,692 | B1 | 8/2019 | Parker et al. |
| 10,387,966 | B1 | 8/2019 | Shah et al. |
| 10,388,135 | B1 | 8/2019 | Jordan, II et al. |
| 10,412,169 | B1 | 9/2019 | Madey et al. |
| 10,446,000 | B2 | 10/2019 | Friar et al. |
| 10,453,146 | B1 | 10/2019 | Stricker et al. |
| 10,453,149 | B1 | 10/2019 | Gaudin et al. |
| 10,467,476 | B1 | 11/2019 | Cardona et al. |
| 10,480,825 | B1 | 11/2019 | Riblet et al. |
| 10,482,746 | B1 | 11/2019 | Moon et al. |
| 10,504,189 | B1 | 12/2019 | Gaudin et al. |
| 10,506,411 | B1 | 12/2019 | Jacob |
| 10,514,669 | B1 | 12/2019 | Call et al. |
| 10,515,372 | B1 | 12/2019 | Jordan, II et al. |
| 10,522,009 | B1 | 12/2019 | Jordan, II et al. |
| 10,546,478 | B1 | 1/2020 | Moon et al. |
| 10,547,918 | B1 | 1/2020 | Moon et al. |
| 10,565,541 | B2 | 2/2020 | Payne et al. |
| 10,573,146 | B1 | 2/2020 | Jordan, II et al. |
| 10,573,149 | B1 | 2/2020 | Jordan, II et al. |
| 10,579,028 | B1 | 3/2020 | Jacob |
| 10,586,177 | B1 | 3/2020 | Choueiter et al. |
| 10,607,295 | B1 | 3/2020 | Hakimi-Boushehri et al. |
| 10,623,509 | B2 | 4/2020 | Delinselle et al. |
| 10,634,576 | B1 | 4/2020 | Schick et al. |
| 10,672,081 | B1 | 6/2020 | Lyons et al. |
| 10,679,292 | B1 | 6/2020 | Call et al. |
| 10,685,402 | B1 | 6/2020 | Bryant et al. |
| 10,699,346 | B1 | 6/2020 | Corder et al. |
| 10,713,726 | B1 | 7/2020 | Allen et al. |
| 10,726,492 | B2 | 7/2020 | Snyder et al. |
| 10,726,494 | B1 | 7/2020 | Shah et al. |
| 10,726,500 | B1 | 7/2020 | Shah et al. |
| 10,733,671 | B1 | 8/2020 | Hakimi-Boushehri et al. |
| 10,733,868 | B2 | 8/2020 | Moon et al. |
| 10,735,829 | B2 | 8/2020 | Petri et al. |
| 10,740,691 | B2 | 8/2020 | Choueiter et al. |
| 10,741,033 | B1 | 8/2020 | Jordan, II et al. |
| 10,750,252 | B2 | 8/2020 | Petri et al. |
| 10,795,329 | B1 | 10/2020 | Jordan, II et al. |
| 10,796,557 | B2 | 10/2020 | Sundermeyer et al. |
| 10,823,458 | B1 | 11/2020 | Riblet et al. |
| 10,824,971 | B1 | 11/2020 | Davis et al. |

(56)                    References Cited

U.S. PATENT DOCUMENTS

| | | | |
|---|---|---|---|
| 10,825,320 B1 | 11/2020 | Moon et al. | |
| 10,825,321 B2 | 11/2020 | Moon et al. | |
| 10,832,225 B1 | 11/2020 | Davis et al. | |
| 10,846,800 B1 | 11/2020 | Bryant et al. | |
| 10,861,115 B1 | 12/2020 | Stricker et al. | |
| 10,922,756 B1 | 2/2021 | Call et al. | |
| 10,922,948 B1 | 2/2021 | Moon et al. | |
| 10,943,447 B1 | 3/2021 | Jordan, II et al. | |
| 10,970,990 B1 | 4/2021 | Jacob | |
| 10,990,069 B1 | 4/2021 | Jacob | |
| 11,003,334 B1 | 5/2021 | Conway et al. | |
| 11,004,320 B1 | 5/2021 | Jordan, II et al. | |
| 11,015,997 B1 | 5/2021 | Schick et al. | |
| 11,017,480 B2 | 5/2021 | Shah et al. | |
| 11,037,255 B1 | 6/2021 | Ganev et al. | |
| 11,042,137 B1 | 6/2021 | Call et al. | |
| 11,042,942 B1 | 6/2021 | Hakimi-Boushehri et al. | |
| 11,043,098 B1 | 6/2021 | Jordan, II et al. | |
| 11,049,078 B1 | 6/2021 | Jordan, II et al. | |
| 11,049,189 B2 | 6/2021 | Shah et al. | |
| 11,055,797 B1 | 7/2021 | Carone | |
| 11,074,659 B1 | 7/2021 | Hakimi-Boushehri et al. | |
| 11,087,347 B1 | 8/2021 | De Guia et al. | |
| 11,087,420 B1 | 8/2021 | Trundle | |
| 11,118,812 B1 | 9/2021 | Riblet et al. | |
| 11,126,708 B2 | 9/2021 | Reimer | |
| 11,210,741 B1 | 12/2021 | Allen et al. | |
| 11,501,100 B1 | 11/2022 | Geng et al. | |
| 11,656,097 B2 | 5/2023 | Vega et al. | |
| 11,748,817 B2 | 9/2023 | Szott | |
| 2003/0120588 A1 | 6/2003 | Dodd et al. | |
| 2005/0055249 A1 | 3/2005 | Helitzer et al. | |
| 2005/0065678 A1 | 3/2005 | Smith et al. | |
| 2005/0171645 A1* | 8/2005 | Oswald | G05B 15/02 |
| | | | 700/29 |
| 2005/0276401 A1 | 12/2005 | Madill, Jr. et al. | |
| 2006/0136273 A1 | 6/2006 | Zizzamia et al. | |
| 2007/0185391 A1 | 8/2007 | Morgan | |
| 2008/0255862 A1 | 10/2008 | Bailey et al. | |
| 2009/0206059 A1 | 8/2009 | Kiko | |
| 2009/0212959 A1 | 8/2009 | Suber | |
| 2009/0261943 A1 | 10/2009 | Jana et al. | |
| 2009/0265193 A1 | 10/2009 | Collins et al. | |
| 2010/0050264 A1 | 2/2010 | Aebig et al. | |
| 2010/0125911 A1 | 5/2010 | Bhaskaran | |
| 2010/0217702 A1 | 8/2010 | Tu | |
| 2010/0293130 A1 | 11/2010 | Stephan et al. | |
| 2011/0270773 A1 | 11/2011 | Siekman et al. | |
| 2011/0295624 A1 | 12/2011 | Chapin et al. | |
| 2012/0016528 A1 | 1/2012 | Raman et al. | |
| 2012/0035777 A1 | 2/2012 | Park | |
| 2012/0072239 A1 | 3/2012 | Gibbard et al. | |
| 2012/0116820 A1 | 5/2012 | English et al. | |
| 2012/0158618 A1 | 6/2012 | Roskos | |
| 2012/0232701 A1* | 9/2012 | Carty | G05D 23/1917 |
| | | | 700/277 |
| 2012/0290104 A1 | 11/2012 | Holt et al. | |
| 2012/0290230 A1 | 11/2012 | Berges Gonzalez et al. | |
| 2013/0006674 A1 | 1/2013 | Bowne et al. | |
| 2013/0041841 A1 | 2/2013 | Lyons | |
| 2013/0066479 A1 | 3/2013 | Shetty et al. | |
| 2013/0073094 A1* | 3/2013 | Knapton | G05B 13/02 |
| | | | 700/278 |
| 2013/0160072 A1 | 6/2013 | Reus et al. | |
| 2013/0262473 A1 | 10/2013 | Scanlon et al. | |
| 2013/0307694 A1 | 11/2013 | Amar | |
| 2013/0338948 A1 | 12/2013 | Zeifman | |
| 2014/0032433 A1 | 1/2014 | Eick et al. | |
| 2014/0129160 A1 | 5/2014 | Tran | |
| 2014/0136242 A1 | 5/2014 | Weekes et al. | |
| 2014/0200929 A1 | 7/2014 | Fitzgerald et al. | |
| 2014/0214750 A1 | 7/2014 | Healy et al. | |
| 2014/0266669 A1 | 9/2014 | Fadell et al. | |
| 2014/0266682 A1 | 9/2014 | Gettings et al. | |
| 2014/0270176 A1 | 9/2014 | Gettings et al. | |
| 2014/0306833 A1 | 10/2014 | Ricci | |
| 2014/0358592 A1 | 12/2014 | Wedig et al. | |
| 2015/0025917 A1 | 1/2015 | Stempora | |
| 2015/0061859 A1 | 3/2015 | Matsuoka et al. | |
| 2015/0154712 A1 | 6/2015 | Cook | |
| 2015/0154847 A1 | 6/2015 | Oliver et al. | |
| 2015/0248643 A1 | 9/2015 | Nathanson | |
| 2015/0268281 A1 | 9/2015 | Haghighat-Kashani | |
| 2015/0347910 A1 | 12/2015 | Fadell et al. | |
| 2015/0357153 A1 | 12/2015 | Makino et al. | |
| 2015/0357155 A1 | 12/2015 | Dohi et al. | |
| 2016/0010888 A1* | 1/2016 | Groskreutz | F24F 11/62 |
| | | | 236/1 C |
| 2016/0035150 A1 | 2/2016 | Barfield, Jr. et al. | |
| 2016/0048934 A1 | 2/2016 | Gross | |
| 2016/0055593 A1 | 2/2016 | Groeneveld | |
| 2016/0055594 A1 | 2/2016 | Emison et al. | |
| 2016/0066066 A1 | 3/2016 | Dharmadhikari et al. | |
| 2016/0098530 A1 | 4/2016 | Pill et al. | |
| 2016/0110818 A1 | 4/2016 | Shemesh et al. | |
| 2016/0117646 A1 | 4/2016 | Lerick et al. | |
| 2016/0127144 A1 | 5/2016 | Takahashi et al. | |
| 2016/0163186 A1 | 6/2016 | Davidson et al. | |
| 2016/0212506 A1 | 7/2016 | Norwood et al. | |
| 2016/0275633 A1 | 9/2016 | Gitt et al. | |
| 2016/0283958 A1 | 9/2016 | Devereaux et al. | |
| 2016/0284029 A1 | 9/2016 | Rhodes et al. | |
| 2016/0305678 A1* | 10/2016 | Pavlovski | G05B 15/02 |
| 2016/0313751 A1* | 10/2016 | Risbeck | G05B 15/02 |
| 2016/0321582 A1 | 11/2016 | Broudou et al. | |
| 2016/0321587 A1 | 11/2016 | Gitt et al. | |
| 2017/0006135 A1 | 1/2017 | Siebel et al. | |
| 2017/0032466 A1 | 2/2017 | Feldman et al. | |
| 2017/0039286 A1 | 2/2017 | Walke et al. | |
| 2017/0061351 A1 | 3/2017 | Lee et al. | |
| 2017/0076408 A1 | 3/2017 | DSouza et al. | |
| 2017/0103465 A1 | 4/2017 | Zentler | |
| 2017/0154382 A1 | 6/2017 | McLaughlin et al. | |
| 2017/0161614 A1 | 6/2017 | Mehta et al. | |
| 2017/0221149 A1 | 8/2017 | Hsu-Hoffman et al. | |
| 2017/0322705 A1 | 11/2017 | Conway et al. | |
| 2018/0006899 A1 | 1/2018 | Ogrinz | |
| 2018/0025430 A1 | 1/2018 | Perl et al. | |
| 2018/0033087 A1 | 2/2018 | Delinselle et al. | |
| 2018/0034657 A1 | 2/2018 | Brown et al. | |
| 2018/0047107 A1 | 2/2018 | Perl et al. | |
| 2018/0191867 A1 | 7/2018 | Siebel et al. | |
| 2019/0011283 A1 | 1/2019 | Soutar et al. | |
| 2019/0035028 A1 | 1/2019 | Jones et al. | |
| 2019/0057466 A1 | 2/2019 | Udell | |
| 2019/0102840 A1 | 4/2019 | Perl et al. | |
| 2019/0121337 A1 | 4/2019 | Cohen et al. | |
| 2019/0163215 A1* | 5/2019 | Cheng | G05B 15/02 |
| 2019/0251520 A1 | 8/2019 | Bentley, III et al. | |
| 2019/0378020 A1* | 12/2019 | Camilus | G05B 19/042 |
| 2020/0302549 A1 | 9/2020 | Jordan et al. | |
| 2020/0327791 A1 | 10/2020 | Moon et al. | |
| 2021/0011448 A1 | 1/2021 | Coleman et al. | |
| 2021/0018335 A1 | 1/2021 | Hood | |
| 2021/0019847 A1 | 1/2021 | Sneed | |
| 2021/0035432 A1 | 2/2021 | Moon et al. | |
| 2021/0042843 A1 | 2/2021 | Bryant et al. | |
| 2021/0150651 A1 | 5/2021 | Shoup | |
| 2021/0158671 A1 | 5/2021 | Jordan et al. | |
| 2021/0182986 A1 | 6/2021 | Butler et al. | |
| 2021/0279791 A1 | 9/2021 | Jacoby | |
| 2021/0350471 A1 | 11/2021 | Hakimi-Boushehri et al. | |
| 2022/0343443 A1 | 10/2022 | Graham et al. | |
| 2022/0391794 A1 | 12/2022 | Singh et al. | |
| 2023/0035517 A1 | 2/2023 | Alfred et al. | |

FOREIGN PATENT DOCUMENTS

| | | | |
|---|---|---|---|
| CN | 111402086 A | 7/2020 | |
| EP | 0769799 A2 | 4/1997 | |
| JP | 53131755 A | 11/1978 | |
| JP | 0917191 A | 1/1997 | |
| JP | 2009272232 A | 11/2009 | |

(56) References Cited

FOREIGN PATENT DOCUMENTS

| JP | 2014010928 A | 1/2014 |
| JP | 2014143096 A | 8/2014 |
| WO | 2018052595 A1 | 3/2018 |

OTHER PUBLICATIONS

"16 Factors that affect Homeowners Insurance premiums" by Insurance.com (Year: 2013).

"Are Appliances Covered Under Homeowners Insurance Policies" by Robert Alley (Year: 2014).

"Does Homeowners Insurance Cover Spoiled Food After a Power Outage," by Allstate—Mar. 2018 (Year: 2018).

"Smart Homes Create New Risk: How Technology Impacts Insurance Coverage" by HUB (Year: 2016).

"Types of Homeowners Insurance Claims," by Pocketsense—pocketsense.com/types-homeowners-insurance-claims-5385090.html (Year: 2017).

Anomaly Detection: A Survey Varun Chandola, Arindam Banerjee, and Vipin Kumar (Year: 2009).

"Chen et al., ""Non-Intrusive Occupancy Monitoring using Smart Meters"" BuildSys 13: Proceedings of the 5th ACM Workshop on Embedded Systems for Energy-Efficient Buildings, Nov. 2013 pp. 1-8https://doi.org/10.1145/2528282.2528294 (Year: 2013)".

Chen et al, Preventing Occupancy Detection From Smart Meters, IEEE Transactions on Smart Grid vol. 6, No. 5, Sep. 2015 ( Year: 2015).

Curb, https://energycurb.com/, Sep. 24, 2017 (Year: 2017).

Current Clamp, downloaded from en.wikipedia.org/wiki/Current_clamp on Feb. 6, 2020 (Year: 2020).

Delany, John, Eyedro EBWEM1 Business Electricity Monitor Review, 2014, downloaded from www.pcmag.com/reviews/eyedro-ebweml-business-electricity-monitor. Feb. 7, 2020 (Year: 2014).

Desjardins/Roost, Smart Water Leak and Freeze Detector, Retrieved from the Internet on May 24, 2019, https://canadianunderwriter.ca/wp-content/uploads/2017/08/desjardins-370x247.jpg , 1 page.

EOSVenturePartners.com, "Neos—a home insurance solution leveraging smart home technology," 2019, Retrieved from the Internet on May 24, 219: http://www.eosventurepartners.com/casestudy/neos-case-study/ , 3 pages.

Facts + Statistics: Homeowners and renters insurance by homeowners (Year: 2020).

Francis, Next-Generation Insurance: Tapping into the Intelligence of Smart Homes, Cognizant (Year: 2015).

International Preliminary Report on Patentability received for PCT Patent Application No. PCT/JP2017/008755, mailed on Dec. 13, 2017, 11 pages (4 pages of English Translation and 7 pages of Original Document).

International Search Report and Written Opinion received for PCT Patent Application No. PCT/JP2017/008755, mailed on Jun. 6, 2017, 9 pages (2 pages of English Translation and 7 pages of Original Document).

Kelly, Neural NILM: Deep Neural Networks Applied to Energy Disaggregation, BuildSys 15: Proceedings of the 2nd ACM International Conference on Embedded Systems for Energy-Efficient Built Environments; Nov. 2015 pp. 55-64 (Year: 2015).

Maestro, Sense Home Energy Monitor Week #1 Update, Sep. 24, 2016. Screen captures dated Feb. 7, 2020 from www.youtube.com/watchv=KqjJT6YcBZQ list=PLbzeOtpXZbGjc8E4fyvQZUNHnhM-PC2J2 (Year: 2016).

Neurio Home Electricity Monitor Review, Jul. 10, 2016, screen capture dated Feb. 7, 2020 from www.youtube.com/watchv= xhEefU FdPWo. Feb. 7, 2020 (Year: 2016).

Patel et al., Internet of Things-IOT: Definition, Characteristics, Architecture, Enabling Technologies, Application Future Challenges, International Journal of Engineering Science and Computing, pp. 6122-6131 (Year: 2016).

Pearson correlation coefficient, downloaded from https://en.wikipedia.org/wiki/Pearson_correlation_coefficient, Dec. 1, 2020 (Year:2020).

Sense Home Energy Monitor Unboxing and Installation, Sep. 19, 2016, Screen captures dated Feb. 7, 2020 from www.youtube.com/watchv=orkcsNw4sDg (Year: 2016).

The SmartShop, Lightwave RF—How to set up the home energy monitor. Dated Oct. 31, 2012. Screen caps at 1:01,2:10, and 3:06. https://www.youtube.com/watchv=COqTgsZpMKU (Year: 2012).

What is a CLUE Report by Roy et al. (Year: 2020).

Liu et al., "Design and Implementation of Smart-Home Monitoring System with the Internet of Things Technology," p. 5, Jan. 2016. Retrieved from: https://www.researchgate.net/publication/300330870_Design_and_Implementation_of_Smart-Home_Monitoring_System_with_the_Internet_of_Things_Technology.

Michalis et al., "Quality Evaluation of Residential Houses: The Development of a Real-Time Quality Assessment Tool," p. 11-12, Jan. 2013. Retrieved from: https://www.researchgate.net/publication/233841366_Quality_Evaluation_of_Residential_Houses_The_Development_of_a_Real-Time_Quality_Assessment_Tool.

Moore et al., "An intelligent maintenance system for continuous cost-based prioritisation of maintenance activities," Aug. 2006. Retrieved from: https://www.researchgate.net/publication/222428855_An_intelligent_maintenance_system_for_continuous_cost-based_prioritisation_of_maintenance_activities.

Spoor et al., "How can data generated by smart home devices help identify consumer needs?," p. 7, Jul. 2016. Retrieved from: https://essay.utwente.nl/69990/1/Spoor_BA_BMS.pdf.

* cited by examiner

100

101
building
environment 120
solar panels 104
property sensors
110

114
smart thermostat 106
user 118
user computing
device 102
control
system 108
controller 116
HVAC unit 122
solar panel
energy storage
system

200

108

| | |
|---|---|
| 320 → EXTERNAL SIGNALS | TIMER ← 306 |
| 322 → INTERNAL SENSORS | OUTPUT ← 308 |
| 302 → RECEIVER | TRANSMITTER ← 310 |
| 324 → RULES | PROCESSOR ← 312 |
| 326 → MESSAGES | NETWORK INTERFACE ← 314 |
| 304 → MEMORY | |

CONTROLLER

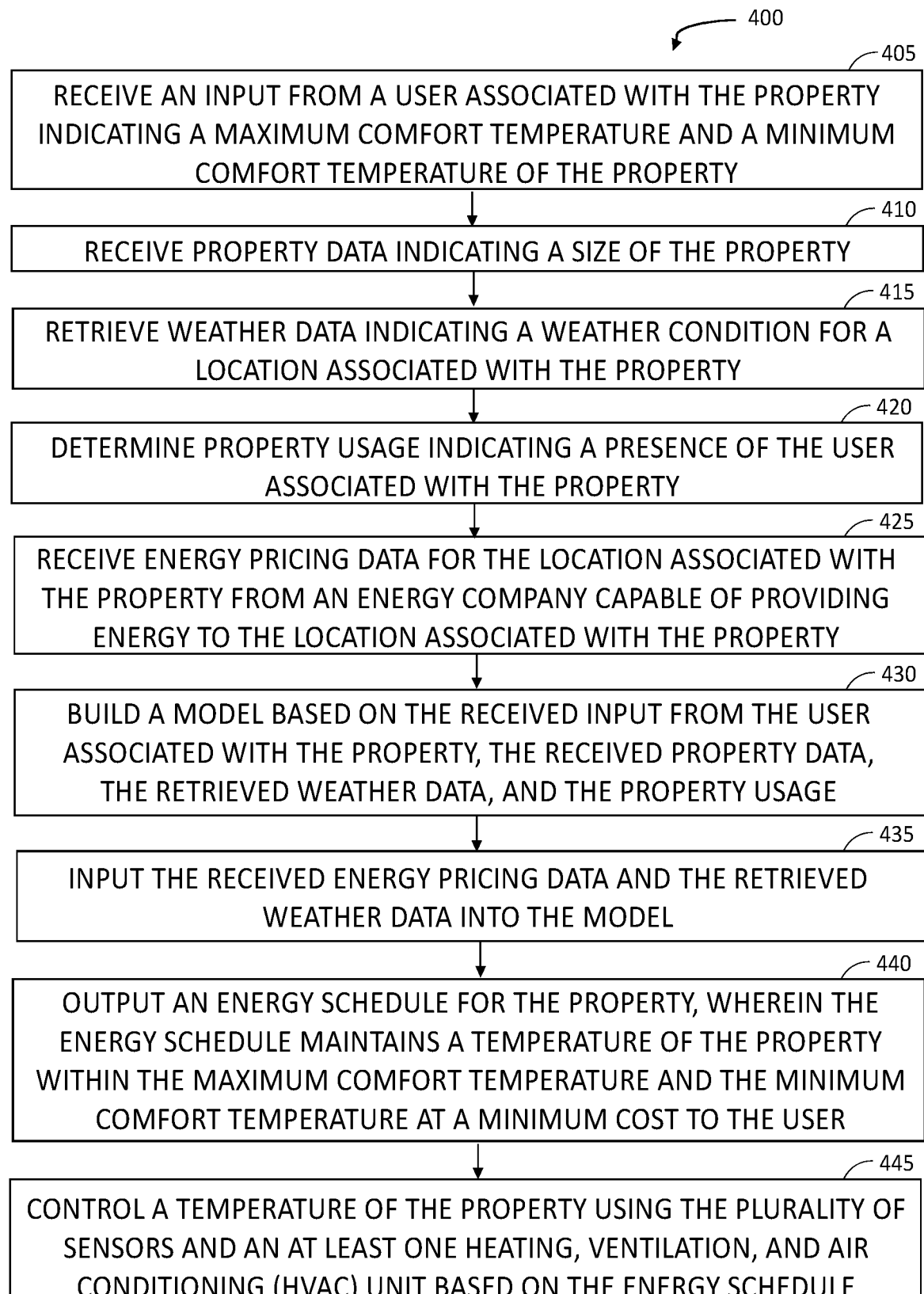

400

405

RECEIVE AN INPUT FROM A USER ASSOCIATED WITH THE PROPERTY INDICATING A MAXIMUM COMFORT TEMPERATURE AND A MINIMUM COMFORT TEMPERATURE OF THE PROPERTY

410

RECEIVE PROPERTY DATA INDICATING A SIZE OF THE PROPERTY

415

RETRIEVE WEATHER DATA INDICATING A WEATHER CONDITION FOR A LOCATION ASSOCIATED WITH THE PROPERTY

420

DETERMINE PROPERTY USAGE INDICATING A PRESENCE OF THE USER ASSOCIATED WITH THE PROPERTY

425

RECEIVE ENERGY PRICING DATA FOR THE LOCATION ASSOCIATED WITH THE PROPERTY FROM AN ENERGY COMPANY CAPABLE OF PROVIDING ENERGY TO THE LOCATION ASSOCIATED WITH THE PROPERTY

430

BUILD A MODEL BASED ON THE RECEIVED INPUT FROM THE USER ASSOCIATED WITH THE PROPERTY, THE RECEIVED PROPERTY DATA, THE RETRIEVED WEATHER DATA, AND THE PROPERTY USAGE

435

INPUT THE RECEIVED ENERGY PRICING DATA AND THE RETRIEVED WEATHER DATA INTO THE MODEL

440

OUTPUT AN ENERGY SCHEDULE FOR THE PROPERTY, WHEREIN THE ENERGY SCHEDULE MAINTAINS A TEMPERATURE OF THE PROPERTY WITHIN THE MAXIMUM COMFORT TEMPERATURE AND THE MINIMUM COMFORT TEMPERATURE AT A MINIMUM COST TO THE USER

445

CONTROL A TEMPERATURE OF THE PROPERTY USING THE PLURALITY OF SENSORS AND AN AT LEAST ONE HEATING, VENTILATION, AND AIR CONDITIONING (HVAC) UNIT BASED ON THE ENERGY SCHEDULE

FIG. 4

SMART ENERGY PLATFORMS AND METHODS FOR A PROPERTY

CROSS-REFERENCE TO RELATED APPLICATIONS

This application claims the benefit of priority to U.S. Provisional Patent Application Ser. No. 63/311,754, filed Feb. 18, 2022, entitled "SMART ENERGY PLATFORMS AND METHODS FOR A PROPERTY," the entire contents and disclosures of which are hereby incorporated herein by reference in its entirety.

FIELD OF USE

The present disclosure relates to smart energy platforms and methods for a property, and more particularly, to systems and methods for intelligently controlling the energy consumption and generation of a property.

BACKGROUND

The amount of energy needed to heat or cool a property may vary based upon a variety of variables including, for example, an outside temperature at the property, an amount of sunlight received by the property, other weather conditions at the property, a size of any structures (home, buildings, etc.) on the property, air leaks in the structure(s), an amount of insulation in the structure(s), heating and cooling sources, etc.

Additionally, the cost of energy to heat or cool a property may vary based upon the price of energy at peak and off-peak hours. Trying to consume energy at off-peak times may require a user of a property (e.g., a property owner or a party responsible for maintaining the property) to monitor and adjust the amount of energy being used at the property during different times of the day, which may be difficult to predict and inefficient to implement.

In addition, some properties are now able to generate energy. For example, solar panels installed on a property may be configured to collect sunlight received at the property and convert it into energy that may either be used at the property or may be transmitted to an electrical grid for providing the solar-generated energy to other properties. In the case where the solar-generated energy is used at the property, this energy may be used to minimize the amount of energy that is needed to be purchased for use at the property. In the case where the solar-generated energy is provided back to the electrical grid, the owner of the property may be paid for this energy which may be used to offset the purchase of other energy that is used at the property, such as at nighttime when the solar panels are not generating energy. Managing the use of and sale of such energy may be difficult and time consuming for a property user.

It is desirable for a property user to have access to a control system that controls a smart energy platform associated with the property to proactively monitor and manage the amount of energy being used at the property and/or any amount of energy being generated at the property. More specifically, there exists a need for a property user to utilize a smart energy platform as described herein to save money by more efficiently using energy at the property through the integration of the smart energy platform.

BRIEF SUMMARY

The present embodiments may relate to systems and methods for, inter alfa, intelligently controlling the energy consumption and generation at a property. Generally, property users want to get the most out of their energy usage. For example, in the summer months, a property user may want to cool their property as quickly as possible and keep cool as long as possible while doing so on a budget, but they may not know exactly how long it takes to cool the property or how long it will stay cool because so many factors impact that calculation and because many of those factors are changing. In some known cases, property users may set a single schedule with their thermostat in a one size fits all approach even though they know temperatures change throughout the day, from day to day, month to month, and season to season, and other variables impacting energy consumption and generation at a property are also changing during the year, which all directly impact the schedule for when and how much energy should be used to minimize energy usage and maximize cost savings.

The smart energy platform described herein is configured to adapt to multiple internal and externals factors and priorities that may change hourly, daily, monthly, or seasonally. The smart energy platform may provide a four-way integration between the property owner's (i) smart thermostat (geofence and scheduling function); (ii) weather and temperature data; (iii) energy company's pricing plan for providing energy; and/or (iv) solar panel generation and storage capabilities at the property. The smart energy platform may leverage data for energy usage (e.g., present at the property vs away from the property), temperature loss (e.g., how quickly a structure such as a home heats up or cools down), electric energy usage cost (e.g., cost of purchasing electricity from electric energy company), and return on investment (ROI) from solar panels (e.g., maximize time or days of peak solar generation).

For example, the smart energy platform may collect property data, and then use machine learning (ML) and artificial intelligence (AI) techniques to track and leverage how long it takes for a property to reach certain temperatures (e.g., cool down and heat up) based upon internal factors. In addition, the smart energy platform may collect and use sensor data and ML/AI techniques to understand that it takes longer to cool down or less time to heat up when people are present at the property versus when the property is unoccupied. The smart energy platform having a smart thermostat may adapt the energy usage and schedule by who is present at the property (e.g., sensor/calendar/holiday integration) when it is cooling or saving electricity (e.g., more people means a warmer property or precool before children arrive at the property from school).

Additionally, the smart energy platform with smart thermostat may adapt the energy usage and schedule based upon energy company peak cost schedules in order to prioritize the best time to cool, precool, or heat the property. Further, the smart energy platform with smart thermostat may adapt the energy usage and schedule based upon the amount of solar power generated at the property by solar panels. The data used by the smart energy platform to adapt the energy usage and schedule may be used in smart home telematics and homeowner insurance products.

As used herein, a "property" may include a piece of real property or land that may further include a structure located on the property. The structure may be a home, an apartment, an office and/or any building or structure that may require electricity, natural gas, and/or any other type of fuel source for heating, cooling and/or otherwise providing some other form of energy to the structure. A smart energy platform at a property may receive an input from a user associated with the property indicating a maximum comfort temperature and a minimum comfort temperature of the property, receive property data indicating a size of the property (e.g., either through an input from the property owner/manager or an API call to a third party property data provider), retrieve weather data indicating a weather condition for a location associated with the property (e.g., either through weather sensors located near the property or an API call to a third party weather data provider), determine property usage indicating a presence of the user at the property (e.g., either through sensors located near the property, mobile device tracking technology or a schedule inputted by the property owner/manager), and receive energy pricing data for the location associated with the property from an energy company capable of providing energy to the location associated with the property.

In response, the smart energy platform at the property may build a model based upon the received input from the user, the received property data, the retrieved weather data, and the property usage, input the received energy pricing data and the retrieved weather data into the model, and output an energy schedule for the property, where the energy schedule maintains a temperature of the property within the maximum comfort temperature and the minimum comfort temperature at a minimum cost to the user. The smart energy platform at the property may then control the temperature of the property using the plurality of sensors and an at least one heating, ventilation, and air conditioning (HVAC) unit based upon the energy schedule for the property. These same techniques may be used for scheduling and controlling usage of other energy using smart devices within the property including, for example, washers, dryers, stoves, ovens, microwaves, heated pools, hot tubs, and any other energy using devices.

In one aspect, a smart energy platform for controlling energy consumption at a property may be provided. The smart energy platform may include a controller. The controller may include one or more local or remote processors, memory devices or units, sensors, servers, transceivers, and display screens. The one or more processors may be programmed to: (i) receive an input from a user associated with the property indicating a maximum comfort temperature and a minimum comfort temperature of the property; (ii) receive property data indicating a size of the property; (iii) retrieve weather data indicating a weather condition for a location associated with the property; (iv) determine property usage indicating a presence of the user at the property; (v) receive energy pricing data for the location associated with the property from an energy company capable of providing energy to the location associated with the property; (vi) build a model based upon the received input from the user, the received property data, the retrieved weather data, and the property usage; (vii) input the received energy pricing data and the retrieved weather data into the model; (viii) output an energy schedule for the property, where the energy schedule maintains a temperature of the property within the maximum comfort temperature and the minimum comfort temperature at a minimum cost to the user; and/or (ix) control the temperature of the property using the plurality of sensors and an at least one heating, ventilation, and air conditioning (HVAC) unit based upon the energy schedule for the property. The smart energy platform may include additional, less, or alternate functionality, including that discussed elsewhere herein.

In another aspect, a computer-implemented method for using a smart energy platform to control energy consumption at a property may be provided. The method may be implemented using a controller. The controller may include one or more processors, one or more transceivers, a memory device, and a plurality of sensors. The method may include, such as via the one or more processors, transceivers, and/or sensors: (i) receiving an input from a user associated with the property indicating a maximum comfort temperature and a minimum comfort temperature of the property; (ii) receiving property data indicating a size of the property; (iii) retrieving weather data indicating a weather condition for a location associated with the property; (iv) determining property usage indicating a presence of the user at the property; (v) receiving energy pricing data for the location associated with the property from an energy company capable of providing energy to the location associated with the property; (vi) building a model based upon the received input from the user, the received property data, the retrieved weather data, and the property usage; (vii) inputting the received energy pricing data and the retrieved weather data into the model; (viii) outputting an energy schedule for the property, where the energy schedule maintains a temperature of the property within the maximum comfort temperature and the minimum comfort temperature at a minimum cost to the user; and/or (ix) controlling the temperature of the property using the plurality of sensors and an at least one heating, ventilation, and air conditioning (HVAC) unit based upon the energy schedule for the property. The method may include additional, fewer, and/or alternative actions, including those discussed elsewhere herein.

In a further aspect, at least one non-transitory computer-readable storage medium may be provided. The non-transitory storage medium may have computer-executable instructions embodied thereon, where when executed by one or more processors of a controller of a property, the computer-executable instructions may cause the one or more processors (and/or associated transceivers and/or sensors) to: (i) receive an input from a user associated with the property indicating a maximum comfort temperature and a minimum comfort temperature of the property; (ii) receive property data indicating a size of the property; (iii) retrieve weather data indicating a weather condition for a location associated with the property; (iv) determine property usage indicating a presence of the user at the property; (v) receive energy pricing data for the location associated with the property from an energy company capable of providing energy to the location associated with the property; (vi) build a model based upon the received input from the user, the received property data, the retrieved weather data, and the property usage; (vii) input the received energy pricing data and the retrieved weather data into the model; (viii) output an energy schedule for the property, where the energy schedule maintains a temperature of the property within the maximum comfort temperature and the minimum comfort temperature at a minimum cost to the user; and/or (ix) control the temperature of the property using the plurality of sensors and an at least one heating, ventilation, and air conditioning (HVAC) unit based upon the energy schedule for the property. The instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown.

FIG. 4 illustrates a flowchart of an exemplary computer-implemented method of using a control system of a smart energy platform to control energy consumption at a property.

Figure 1:
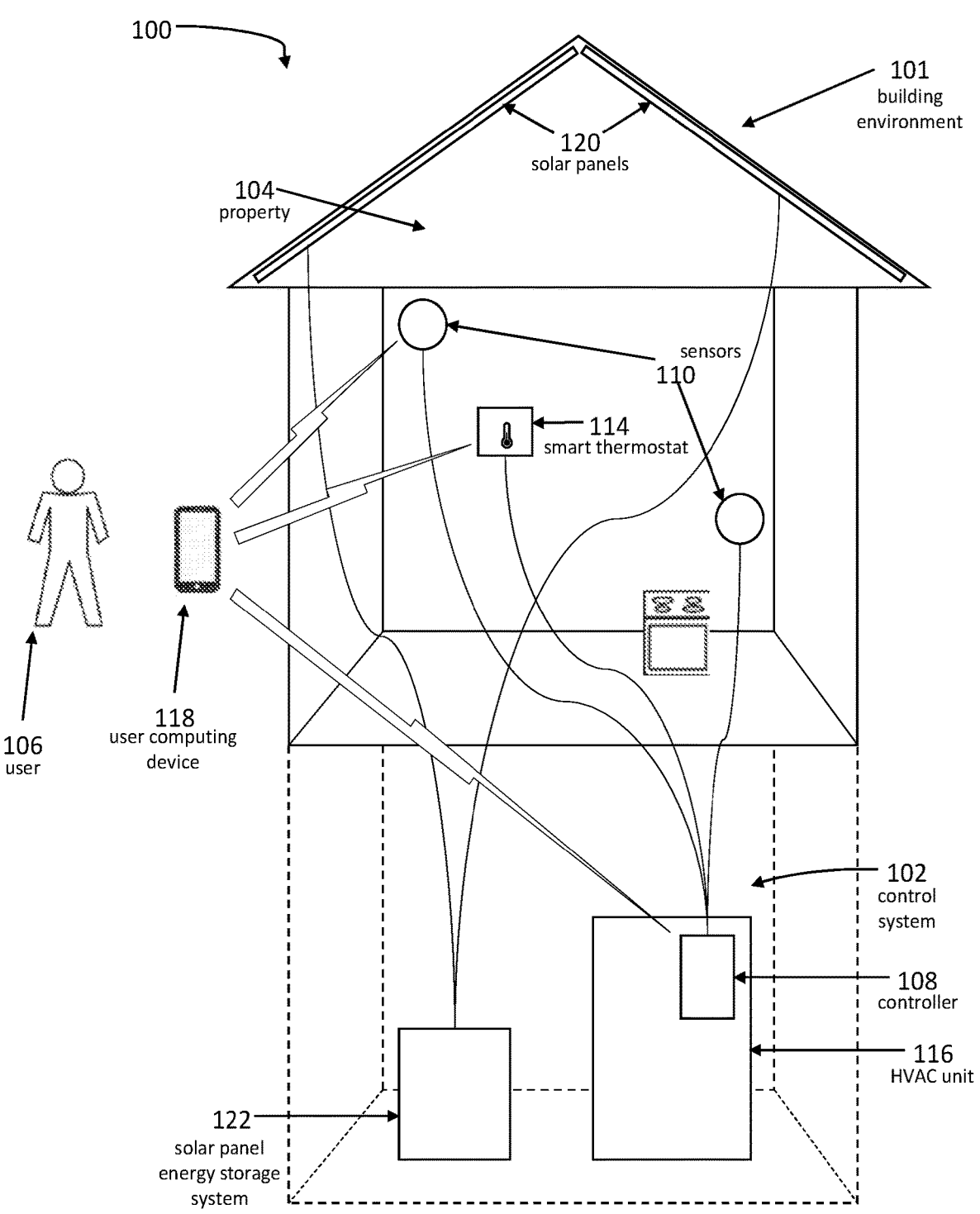
FIG. 1 depicts an exemplary smart energy platform within a building environment in which an exemplary control system controls energy consumption at a property.

The Figures depict preferred embodiments for purposes of illustration only. One skilled in the art will readily recognize from the following discussion that alternative embodiments of the systems and methods illustrated herein may be employed without departing from the principles of the disclosure described herein.

DETAILED DESCRIPTION OF THE DRAWINGS

The present embodiments may relate to, inter alfa, systems and methods for controlling energy consumption at a property while minimizing an amount of spend for purchasing the energy and maintaining a budget. As used herein, a "property" may include a piece of real property or land that further includes a structure located on the property. The structure may be a home, an apartment, an office and/or any building or structure that may require electricity, natural gas, and/or any other type of fuel source for heating, cooling and/or otherwise providing some other form of energy to the structure.

The smart energy platform described herein integrates energy pricing data, location data, weather data, energy usage data, and energy generation data to efficiently use energy and reduce energy costs for the user. The smart energy platform may include a controller. The controller includes one or more processors and at least one memory device. The controller is also in communication with a plurality of sensors and/or a plurality of third-party data providers.

The controller may be programmed to receive an input from a user associated with the property indicating a maximum comfort temperature and a minimum comfort temperature of the property associated with an owner, a manger, and/or a user of the property, receive property data indicating a size of the property, retrieve weather data indicating a weather condition for a location associated with the property, determine property usage indicating a presence of the user at the property, and receive energy pricing data for the location associated with the property from an energy company capable of providing energy to the location associated with the property. The controller, in response, may build a model based upon the received inputs from the user, the received property data, the retrieved weather data, and the property usage, input the received energy pricing data and the retrieved weather data into the model, output an energy schedule for the property, where the energy schedule maintains a temperature of the property within the maximum comfort temperature and the minimum comfort temperature at a minimum cost to the user; and/or control the temperature of the property using the plurality of sensors and an at least one heating, ventilation, and air conditioning (HVAC) unit based upon the energy schedule for the property.

In the exemplary embodiment, the smart energy platform may be implemented within a property, which includes a piece of real property or land that further includes a structure located on the property. The structure included within the property may be a home, an apartment, an office and/or any building or structure that may require electricity, natural gas, and/or any other type of fuel source for heating, cooling and/or otherwise providing some other form of energy to the structure. The property may further include a plurality of sensors, at least one heating, ventilation, and air conditioning (HVAC) unit and other energy consuming devices or appliances, at least one energy generator, such as one or more solar panels, and an energy storage system. The plurality of sensors may include a smart thermostat. The smart energy platform may proactively monitor energy usage and control energy consumption at the property, which may vary based upon the weather and the price of energy at peak and off-peak hours. The smart energy platform described herein may be implemented to control a temperature of the property between a maximum comfort temperature and a minimum comfort temperature inputted by a user of the property at a minimum cost to the user. These same techniques may be used for scheduling and controlling usage of other energy using smart devices within the property including, for example, washers, dryers, stoves, ovens, microwaves, heated pools, hot tubs, and any other energy using devices.

As described further herein, the smart energy platform may be implemented to determine property usage based upon a presence schedule inputted by the user, location data associated with a user computing device of the user, and/or data received from the plurality of sensors located near or within the property. The smart energy platform may also be implemented to determine the location associated with the property based upon location data associated with a user computing device of the user or location data received from the plurality of sensors.

In addition, the smart energy platform may be programmed to receive solar generation data from at least one solar panel associated with the property indicating an amount of solar energy generated by the at least one solar panel. The smart energy platform may also be implemented to input the received solar generation data into the model, output an energy schedule for the property, where the energy schedule is based upon the amount of solar energy generated by the at least one solar panel, and/or control the at least one solar panel based upon the energy schedule for the property, where the at least one solar panel may be controlled to use the generated solar energy in controlling the temperature of the property, store the generated solar energy in an energy storage system associated with the property, and/or send the generated solar energy back to an electric grid connected to the property.

In some embodiments, the control system described herein may be provided as part of a "Smart Home" system including a plurality of "smart" or interconnected computing devices. The control system may be interconnected to one or more other computing devices via a wired and/or wireless connection, such that a user of the control system (e.g., a property owner) may be able to control one or more parameters or settings of the control system using a control panel and/or a connected "smart" user computing device, such as a smart phone, personal computer, or tablet. "Smart Home" systems may include, for example, security systems, interior and/or exterior lighting systems, garage door systems, utility monitoring systems, programmable HVAC systems, smart appliances, smart home controllers or command devices (e.g., Amazon Echo®, Google Home®, etc.), and/or a plurality of other systems and/or computing devices.

Exemplary sensors placed about a home and/or embedded within building or construction materials (such embedded throughout construction materials and/or embedded within certain or limited amounts of construction materials that are used at specific or strategic locations within the home), are shown in the Figures and discussed further below. The sensors may be "smart sensors", and each may include one or more types of sensors (motion, temperature, sound/audio signal, etc.), processors, power units, batteries, clocks, Global Positioning System (GPS) units, memory units, instructions, clocks, actuators, transmitter, receivers, transceivers, other electronic components, miniature electronics, and circuitry, etc. Each smart sensor may be configured for wireless radio frequency (RF) communication and/or data signals to other devices, such as the user computing device, smart home controller, and/or remote servers, such as remote servers associated with insurance providers.

Systems and methods are described herein for controlling energy consumption at a property. In one embodiment, a smart energy platform may be provided. The smart energy platform may include a controller configured to: (i) receive an input from a user associated with the property indicating a maximum comfort temperature and a minimum comfort temperature of the property; (ii) receive property data indicating a size of the property; (iii) retrieve weather data indicating a weather condition for a location associated with the property; (iv) determine property usage indicating a presence of the user at the property; (v) receive energy pricing data for the location associated with the property from an energy company capable of providing energy to the location associated with the property; (vi) build a model based upon the received input from the user, the received property data, the retrieved weather data, and the property usage; (vii) input the received energy pricing data and the retrieved weather data into the model; (viii) output an energy schedule for the property, where the energy schedule maintains a temperature of the property within the maximum comfort temperature and the minimum comfort temperature at a minimum cost to the user; and/or (ix) control the temperature of the property using the plurality of sensors and an at least one heating, ventilation, and air conditioning (HVAC) unit based upon the energy schedule for the property.

At least one of the technical problems addressed by this system may include: (i) inability to efficiently control the energy usage of a property with minimal input from a user; (ii) inability to efficiently control energy usage of a property with only a maximum acceptable temperature and a minimum acceptable temperature inputted by a user of the property; (iii) inability to maximize energy efficiency of a property within a budget; (iv) inability to take into account daily and sometimes hourly fluctuations in energy prices for a property; (v) difficulty in manually monitoring and adjusting energy usage of a property; and/or (vi) difficulty in monitoring energy prices at peak and off-peak hours.

The technical effect achieved by this system may be at least one of: (i) ability to efficiently control the energy usage of a property with minimal input from a user; (ii) ability to efficiently control energy usage of a property with only a maximum acceptable temperature and a minimum acceptable temperature inputted by a user of the property; (iii) ability to maximize energy efficiency of a property and meeting budgetary constraints; (iv) ability to take into account daily and sometimes hourly fluctuations in energy prices for a property; (iv) automatic monitoring and adjusting of energy usage at a property; and/or (v) automatic monitoring of energy prices at peak and off-peak hours. Other technical effects may include the intersection of wireless communication (such as between sensors, computing devices, and/or insurance provider remote servers) and insurance-related activities (such as generating recommendations that increase energy efficiency and reduce energy usage cost, and/or updating insurance policies, premiums, discounts, and/or rates based upon a more accurate and up-to-date picture of insurance-related risk, or lack of risk, due to energy consumption at a property).

Exemplary Smart Energy Platforms for a Property

FIG. 1 depicts an exemplary smart energy platform 100 within a building environment 101. Smart energy platform 100 includes a control system 102 that monitors energy usage and generation at a property 104, such as a residential home or other building of a user 106. Smart energy platform 100 may also include a smart thermostat 114 and at least one solar panel 120. In the exemplary embodiment, control system 102 may include a controller 108 and a plurality of sensors 110 deployed (and/or embedded) throughout property 104. Sensors 110 may include, broadly, any kind of sensor 110 (e.g., temperature, motion, sound/audio signal, light, etc.). However, in the exemplary embodiment, sensors 110 specifically include a smart thermostat 114, as described further herein.

In the exemplary embodiment, property 104 may include at least one HVAC unit 116 and/or other smart devices or appliances (not shown). HVAC unit 116 is configured to circulate air (e.g., heated and/or cooled air, in some embodiments) throughout property 104. In some embodiments, controller 108 may activate or deactivate HVAC unit 116 to bring a temperature of air within property 104 to a desired (e.g., predetermined by a user, such as user 106) temperature. The desired temperature may be set and/or programmed using a thermostat (including a smart thermostat) and/or alternative control device (e.g., a user computer device 118 of user 106). In some embodiments, the desired temperature may be within a maximum comfort temperature and a minimum comfort temperature. The maximum and minimum comfort temperatures may be based upon input by user 106.

Additionally, in the exemplary embodiment, property 104 may include at least one solar panel 120. Solar panel 120 is configured to generate solar energy. In some embodiments, solar panel 120 may be programmed to use the generated solar energy in controlling the temperature of property 104. In other embodiments, solar panel 120 may be programmed to store the generated solar energy in an energy storage system 122. In still other embodiments, solar panel 120 may be programmed to send the generated solar energy back to an electric grid 210 (shown and described with respect to FIG. 2) connected to property 104. While the above description is directed to solar power, one having skill in the art would understand that other forms of power generation may be used, including, but not limited to, wind electric power, micro-hydroelectric power, and/or a hybrid system.

In the exemplary embodiment, controller 108 is in communication with HVAC unit 116 such that controller 108 may control operation of HVAC unit 116. In one embodiment, controller 108 may be coupled to and/or adjacent to HVAC unit 116, such that controller 108 is accessible within property 104 and may be in wired and/or wireless communication with HVAC unit 116. In another embodiment, controller 108 may be remote from HVAC unit 116, such as coupled to and/or integral to smart thermostat 114 within property 104. In still other embodiments, controller 108 may be exterior to property 104 and/or accessible by an alternative control device (e.g., user computer device 118 of user 106).

Irrespective of the location of controller 108, controller 108 is in wired and/or wireless communication with HVAC unit 116 (e.g., via one or more receivers, transmitters, and/or receivers within controller 108 and/or one or more components of HVAC unit 116) such that controller 108 may receive messages from and/or transmit messages to HVAC unit 116.

As described further herein, controller 108 may be further configured to receive messages from and/or transmit control messages to one or more other devices associated with property 104, including, for instance, sensors 110, smart thermostat 114, solar panel 120, and/or solar panel energy storage system 122. Controller 108 may be further configured to receive messages from and/or transmit messages to one or more other remote devices, such as user computer device 118, remote servers such as a hub 202 and/or an insurance server 204 (also known as an insurance network server 204), and/or energy company computer device 206 and/or weather service computer device 208 (shown and described with respect to FIG. 2).

In the exemplary embodiment, sensors 110 and smart thermostat 114 may operate to measure a temperature of property 104. Upon detection of a temperature, smart thermostat 114 is triggered or activated to be in communication with HVAC unit 116 to bring a temperature of air within property 104 to a desired (e.g., predetermined by a user such as user 106) temperature. In some embodiments, the desired predetermined temperature may be within a maximum comfort temperature and a minimum comfort temperature. In some embodiments, a plurality of smart thermostats 114 within property 104 may be in communication with one another, such that activation of one smart thermostat 114 automatically triggers the rest of the smart thermostats 114 to activate. For instance, the activated smart thermostat 114 may transmit a signal to the rest of the smart thermostats 114 that cause the rest of the smart thermostats 114 to activate and also be in communication with HVAC unit 116 to bring a temperature of air within property 104 to a desired (e.g., predetermined by a user such as user 106) temperature.

In other embodiments, one or more of smart thermostats 114 may operate independently of the others. Additionally, or alternatively, smart thermostat 114 may transmit a signal to another device, such as controller 108, the user computer device 118, and/or a remote computing device (e.g., a remote server such as insurance server 204).

In the exemplary embodiment, sensors 110 (e.g., smart thermostat 114 and/or other sensors) may be in wired communication with controller 108. In other embodiments, some sensors 110 may be in wireless communication with controller 108 (e.g., via an IEEE 802.11 wireless local area network). In still other embodiments, sensor data may be stored local to sensors 110 and transferred to, or collected from, sensors 110 and transferred to controller 108 for storage. Further, in the example embodiment, some sensors 110 may be locally powered (e.g., battery, direct-attached solar array), other sensors 110 may be powered via connection to a power distribution network (e.g., 120-Volt Alternating Current network of property 104), and still other sensors 110 may not require power or are otherwise self-powered.

In the exemplary embodiment, controller 108 may be configured to receive an input from user 106 indicating a maximum comfort temperature and a minimum comfort temperature of property 104. Additionally, controller 108 may be configured to receive property data indicating a size of property 104 and energy pricing data at a location associated with property 104. Controller 108 may also be configured to retrieve weather data indicating a weather condition at a location associated with property 104. In some embodiments, the location of property 104 may be based upon location data associated with user computer device 118 of user 106. In other embodiments, the location of property 104 may be based upon data from sensors 110. In some embodiments, the property data may be retrieved through an API from a third-party who maintains such data (e.g., websites used to sell properties), and weather data may be retrieved through an API from a third-party who maintains such weather data.

In the exemplary embodiment, controller 108 may be configured to determine property usage indicating a presence of user 106 at property 104. In some embodiments, the property usage may be based upon a presence schedule inputted by user 106. In other embodiments, the property usage may be based upon location data associated with user computer device 118 of user 106. In still other embodiments, the property usage may be based upon data received from sensors 110.

In response, controller 108 may be configured to build a model based upon the received input from user 106, the property data indicating a size of property 104, the weather data indicating a weather condition at a location associated with property 104, and the property usage indicating a presence of user 106 at property 104. Controller 108 may also be configured to input the received energy pricing data and the weather data into the model, output an energy schedule for property 104, and control a temperature of property 104 using sensors 110 and HVAC unit 116 based upon the energy schedule. The energy schedule for property 104 may be used to maintain a temperature of property 104 within the maximum comfort temperature and the minimum comfort temperature inputted by user 106 at a minimum cost to user 106. In some embodiments, the model may simulate the behavior of the user(s) 106 and the property 104 based upon the weather and the user(s)' routines.

The model may be created over time based upon observations of settings set by the user 106, historical weather data, historical energy data, historical sensor data, and other information provided by the user 106. For example, the model may be able to determine the desired minimum and maximum temperatures desired by the user 106 based upon the time of day, day of the week, time of year, current temperature, and other provided information. For instance, the model may determine that today is a snow day, where the user(s) 106 are home from school and update the projected energy usage patterns based upon that information.

Additional Exemplary Smart Energy Platforms

Figure 2:
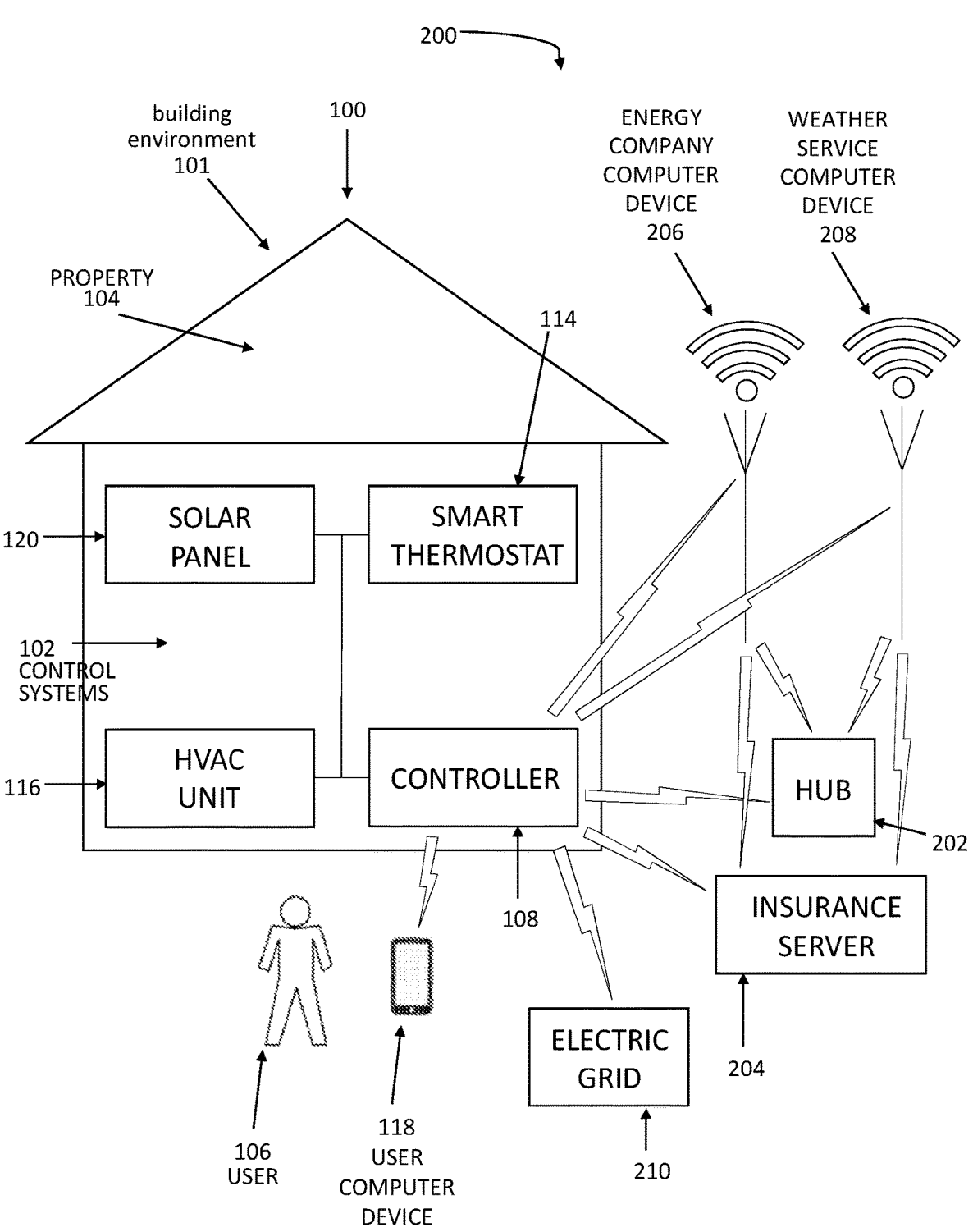
FIG. 2 depicts an exemplary schematic diagram of the control system shown in FIG. 1.

FIG. 2 depicts an exemplary environment 200 including smart energy platform 100 within building environment 101 shown in FIG. 1, illustrating another implementation of the exemplary control system 102. In the exemplary embodiment, controller 108 of control system 102 may be further in communication (via a wired and/or wireless connection) with one or more remote devices. In particular, controller 108 may be in communication with a hub 202, an insurance server 204, an energy company computer device 206, a weather service computer device 208, and/or an electric grid 210.

Energy company computer device 206 may include any energy company source capable of providing energy to a location associated with property 104. Energy company computer device 206 may include a radio antenna in some embodiments, and additionally or alternatively, may include any other type of transmitter, transceiver, and/or receiver capable of wirelessly (and/or over a wired connection) transmitting signals or messages. Energy company computer device 206 may be any other component capable of transmitting energy company data in any format.

Energy company computer device 206 may transmit a signal including energy pricing data. The energy pricing data may include a timetable of energy prices at corresponding times. The energy pricing data may be based upon a location associated with property 104 and the provider of the energy. The location associated with property 104 may be based upon location data received from a remote computing device (such as user computer device 118) associated with user 106 and/or location data received from sensors 110.

In some embodiments, energy company computer device 206 may be connected to hub 202 and/or controller 108 via the Internet. For example the energy company computer device 206 may provide information via a website, an application, an API (Application Programming Interface), push notifications, or other interface that allows for retrieving energy pricing data and/or other information.

Weather service computer device 208 may include any source of weather information. For instance, weather service computer device 208 may include a component of an independent weather service broadcast system, a computer device associated with a local and/or dispatch weather service, and/or a component of any other weather alert/notification system. Weather service computer device 208 may include a radio antenna in some embodiments, and additionally or alternatively may include any other type of transmitter, transceiver, and/or receiver capable of wirelessly (and/or over a wired connection) transmitting signals or messages. Weather service computer device 208 may be any component capable of transmitting weather service data in any format. Weather service computer device 208 may transmit a signal including weather data. The weather data may be based upon a location associated with property 104.

The location associated with property 104 may be based upon location data received from a remote computing device (such as user computer device 118) associated with user 106 and/or location data received from sensors 110. In some embodiments, weather service computer device 208 may be connected to hub 202 and/or controller 108 via the Internet. For example the weather service computer device 208 may provide information via a website, an application, an API, push notifications, or other interface that allows for retrieving weather data and/or other information.

In the exemplary embodiment, controller 108 may include any suitable transceiver or receiver configured to receive data from energy company computer device 206 and to retrieve data from weather service computer device 208. For example, in one embodiment, controller 108 may include a radio antenna and receiver and may continuously monitor for signal data that are locally broadcast by energy company computer device 206 and weather service computer device 208 in the same location area as controller 108 and/or property 104. In other embodiments, controller 108 communicates with the energy company computer device 206 and/or the weather services computer device 208 via a network connection, such as through a wide area network (WAN) or the Internet.

Additionally or alternatively, controller 108 may include pre-set or user-configured location data or a GPS receiver to indicate a location of property 104 and/or controller 108. Thus, a controller 108 tuned to a local frequency may receive and retrieve data that is relevant for the location of property 104 and/or controller 108. Similarly, controller 108 having a location indication (e.g., pre-set, user-configured, or GPS location data) may determine whether received data includes location data indicating that the signal is relevant to the current location of controller 108.

In such implementations of the exemplary embodiment, the signal that triggers controller 108 may include the received data from energy company computer device 206 and the retrieved data from weather service computer device 208. As described further herein, the trigger may additionally or alternatively include data received from sensors 110, an alternative source (e.g., hub 202), and/or data received from another source (e.g., hub 202, insurance server 204, and/or user computer device 118). The received data, when associated with received data, may include property data, weather data, property usage, and/or energy pricing data.

When a signal for the location of controller 108 is received or retrieved if previously stored, the type and content may be identified. In some embodiments, controller 108 may communicate the data and/or portions of the data to user 106, as described further herein. In other embodiments, controller 108 may communicate the data to user 106 and may also automatically transmit the data to HVAC unit 116, as described herein.

Controller 108 may be further configured to use received and retrieved data to build a model to output an energy schedule for property 104. In such embodiments, controller 108 may transmit the energy schedule to control a temperature of property 104 using sensors 110 and HVAC unit 116. Controller 108 may activate or deactivate HVAC unit 116 to control the temperature of property 104, which may be maintained between a maximum comfort temperature and a minimum comfort temperature as input by user 106. In other embodiments, controller 108 may control solar panel 120 based upon the energy schedule by controlling solar panel 120 to use the generated solar energy in controlling the temperature of property 104, store the generated solar energy in energy storage system 122, or send the generated solar energy to electric grid 210 connected to property 104. In some embodiments, retrieved data may be constantly fed to controller 108 so that the model may continually update the energy schedule to reflect the changes in the inputted parameters such as weather conditions, amount of sunlight, etc.

Hub 202 may include a computing device configured to continuously monitor for and/or receive message data from energy company computer device 206, retrieve weather data from weather service computer device 208, and transmit relevant data to controller 108. "Relevant" data may include any data associated with a location including property 104. Accordingly, hub 202 may filter signal data received from one or more energy company computer devices 206 and retrieved from one or more weather service computer devices 208 and only transmit relevant signal data to controller 108.

Additionally or alternatively, hub 202 may be configured to reformat received signal data into a format receivable and/or processable by controller 108. For instance, hub 202 may include a radio antenna and/or other radio receiver configured to receive energy pricing data and associated signal data from energy company computer device 206. Hub 202 may additionally include a radio antenna and/or other radio receiver configured to retrieve weather data and associated signal data from weather service computer device 208. Hub 202 may further include any suitable computing components to reformat the radio-based alert into a text-based signal (e.g., a text message or email message) receivable by controller 108.

In the exemplary embodiment, insurance server 204 includes one or more computing devices and/or computing systems associated with and/or operated by an insurance entity that maintains one or more insurance policies associated with property 104 (e.g., property owner's insurance, flood insurance, renter's insurance, personal property insurance, etc.). Accordingly, insurance server 204 may collect and maintain data records associated with property 104 and/or insurance policies associated therewith. For instance, insurance server 204 may maintain claim records, premium information, and/or any other information.

Insurance server 204 may be configured to receive signal data from energy company computer device 206, weather service computer device 208, hub 202, and/or controller 108. For instance, insurance server 204 may receive signal data associated with locations including a plurality of properties 104 that may be affected by weather data or may be associated with energy pricing data from hub 202. Insurance server 204 may additionally or alternatively receive signal data associated with and/or relevant to one particular property 104 from controller 108 associated with that property 104. In some embodiments, insurance server 204 may receive signal data directly from one or more energy company computer devices 206 and retrieve signal data directly from one or more weather service computer devices 208 within range of insurance server 204.

In some embodiments, insurance server 204 may be configured to transmit one or more messages to controller 108 based upon received data. Insurance server 204 may transmit signals causing controller 108 to build a model to output an energy schedule for property 104 based upon input from user 106, property data, weather data, property usage, and energy pricing data.

In the exemplary embodiment, user computer device 118 of user 106 may also be configured to receive and retrieve signal data, from controller 108, hub 202, insurance server 204, energy company computer device 206, and/or weather service computer device 208. In some embodiments, user 106 may receive signal data and/or may be notified of a signal based upon preference settings selected by user 106. For example, user 106 may choose to be notified via user computer device 118. In other embodiments, user 106 may choose to be notified via visual indicators (e.g., LED lights) on a control panel of controller 108.

In some embodiments, user 106 may have a user preference that a request for user response be included in certain notifications sent. For example, an email message or a text message may be sent to user computer device 118 indicating that an energy pricing data signal or a weather data signal was received and/or retrieved. Upon viewing the email or text message, user 106 may respond with an instruction to override the subsequent automatic temperature control steps by sending a signal (e.g., within a further email or text message) to controller 108. However, if no user response is detected within a specified time period, or if user 106 has configured controller 108 to automatically initiate a temperature control of property 104, then controller 108 may proceed to automatically control the temperature of property 104 based upon the energy schedule for property 104, the maximum comfort temperature and minimum comfort temperature input by user 106, and minimizing the cost of energy usage for user 106.

It should be understood that although particular messages are described herein, such as energy pricing data messages and weather data messages, additional and/or alternative messages to the controller may be contemplated. For instance, a user (such as user 106) may utilize user computer device 118 (shown in FIG. 1) to manually generate and transmit a message to the controller 108. The message may be formatted as a control message configured to cause the controller 108 to perform the energy consumption control steps described herein. Such functionality may be useful for property users remote from a property 104 such as a vacation home. The property user 106 and/or a third party, such as a property management company or an insurance provider maintaining a policy associated with the property 104, may send the message. Moreover, it should be understood that although reference is made herein to a "property user," any such reference may be equally applicable to a property owner, a family member of a property owner, a renter, and/or a third party.

Exemplary Controller

Figure 3:
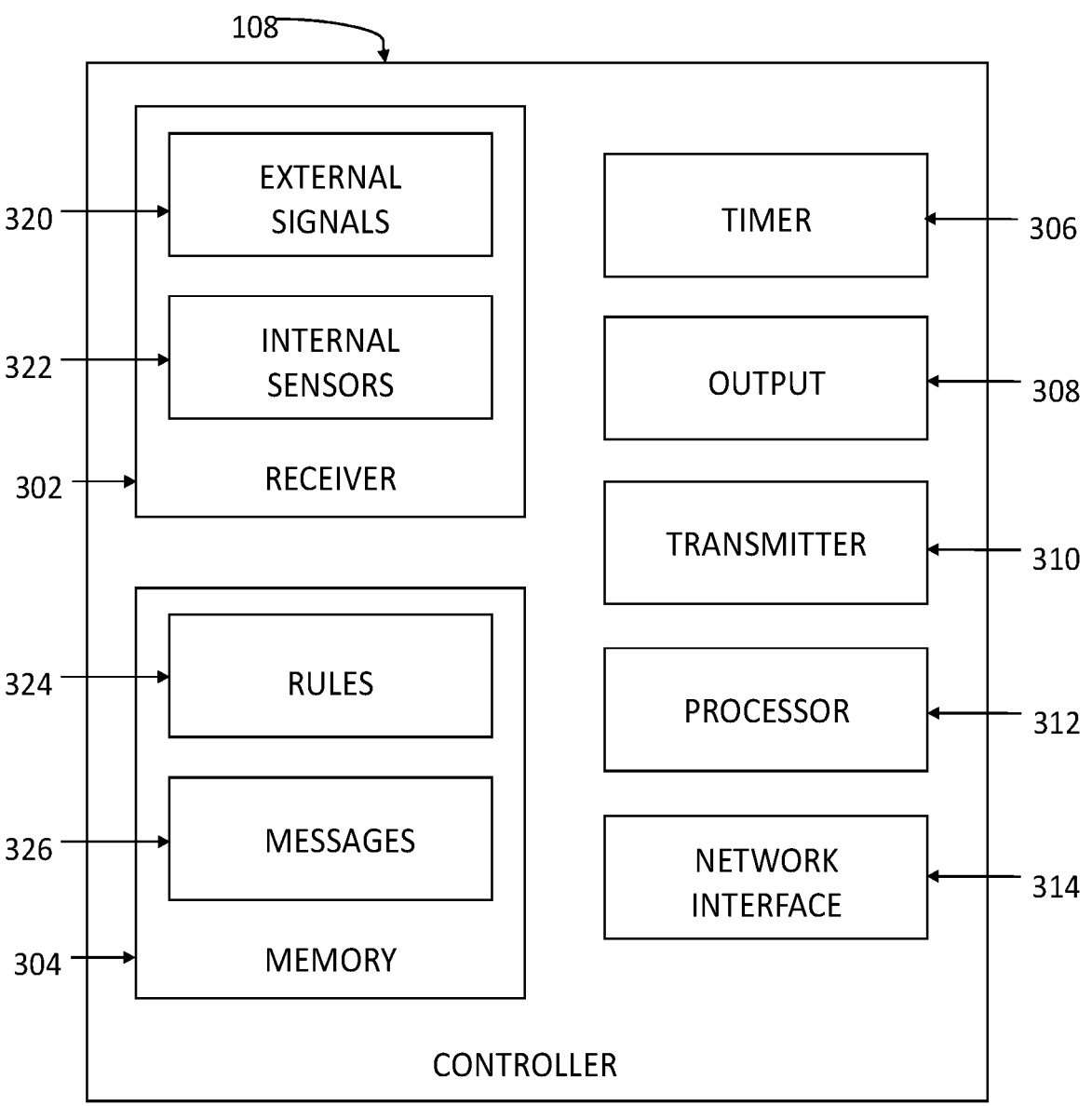
FIG. 3 depicts a schematic diagram of an exemplary controller that may be used in the control system shown in FIG. 1.

FIG. 3 depicts an exemplary embodiment of controller 108 for use in control system 102 (shown in FIG. 1). Controller 108 may include a plurality of components, such as, but not limited to, a receiver 302, a memory 304, a timer 306, an output device 308, a transmitter 310, a processor 312, and/or a network interface 314. It should be understood that certain components illustrated as separate may, in alternative embodiments, be implemented within the same component.

Receiver 302 may be configured to receive one or more formats or types of incoming messages. For instance, receiver 302 may include an external messages receiving unit 320 (e.g., an antenna) configured to receive and retrieve data (e.g., weather service data and energy pricing data) and/or an internal sensors receiving unit 322 configured to receive sensor data (e.g., sensors 110 and smart thermostat 114, shown in FIG. 1). Receiver 302 may include additional, fewer, and/or alternative units.

Memory 304 may include any suitable type of memory configured to store data. In some embodiments, memory 304 stores rules 324 and message 326. Rules 324 may include rules directed to when and how controller 108 should retrieve weather data and receive energy pricing data, when and how to receive input from user 106 indicating a maximum comfort temperature and a minimum comfort temperature of property 104, when and how to receive property data indicating a size of property 104, when and how to determine property usage indicating a presence of user 106 at property 104, when and how to build a model to output an energy schedule for property 104, when and how to activate or deactivate HVAC unit 116 to control the temperature of property 104, and/or user preferences. Controller 108 may store message 326 in memory 304 to track received data (which may include any kind of received external data, internal sensor data, and/or a record thereof).

Timer 306 may be configured to implement one or more stored rules 324 regarding when controller 108 may retrieve weather data, receive energy pricing data, and/or transmit an energy schedule to control a temperature of property 104.

Output device 308 may include any suitable output device capable of making information accessible to a user (e.g., user 106). Output device 308 may include one or more visual indicators, such as LED lights, a screen, and/or a touch screen. Controller 108 may make information available to user 106 via output device 308, such as any received external signals and/or internal sensor data signals, the status of HVAC unit 116, and/or any other information.

Transmitter 310 may include any hardware and/or software components suitable to transmit information from control 108 to another computing device, such as user computer device 118, insurance server 204, and/or HVAC unit 116. Controller 108 may use transmitter 310 to transmit control signals, status updates, alerts, alert data, notifications, and/or any other information.

Processor 312 may include any processing hardware and/or software such that controller 108 may function as described herein. Processor 312 may be used to implement one or more processes described herein, such as receiving external signals, retrieving external signals, receiving internal sensor data signals, processing external signals, processing internal sensor data signals, generating control signals, and/or any other processes of controller 108.

Network interface 314 may include any network interface hardware such that controller 108 is accessible and/or may access one or more networks, such as a Wi-Fi network within property 104, near-field networks such as BLUETOOTH®, Local or Wide-Area Networks, and/or any other network. Network interface 314 may facilitate communication between controller 108 and one or more other devices, such as HVAC unit 116, user computer device 118, and/or insurance server 204.

Exemplary Computer-Implemented Method of Using a Smart Energy Platform to Control Energy Consumption FIG. 4 illustrates a flow chart of an exemplary computer implemented process 400 for using a smart energy platform to control energy consumption at a property 104 (shown in FIG. 1). Process 400 may be implemented by a computing device, for example controller 108 (shown in FIG. 1). Process 400 may include a plurality of steps. In the exemplary embodiment, controller 108 may be in communication with user computer device 118 (shown in FIG. 1), energy company computer device 206 (shown in FIG. 5), weather service computer device 208 (shown in FIG. 5), and/or insurance network server 204 (all shown in FIG. 2).

In the exemplary embodiment, process 400 may include receiving 405 an input from a user 106 associated with the property 104 indicating a maximum comfort temperature and a minimum comfort temperature of the property 104. The maximum comfort temperature and minimum comfort temperature of the property 104 may be stored in a database associated with controller 108 such as database 510 (shown in FIG. 5). In some embodiment, the maximum and minimum temperatures are the only inputs needed from the user to manage the system.

Process 400 may also include receiving 410 property data indicating a size of the property 104. The property data may be stored in database 510.

Process 400 may also include retrieving 415 weather data indicating a weather condition for a location associated with the property 104. The weather data and the location associated with the property 104 may be stored in database 510. The location associated with the property 104 may be based upon location data associated with a user computer device 118 of the user 106 or on location data received from a plurality of sensors 110 (shown in FIG. 1).

Process 400 may also include determining 420 property usage indicating a presence of the user 106 at the property 104. The property usage may be stored in database 510. Property usage may be based upon a presence schedule inputted by the user 106, on location data associated with a user computer device 118 of the user 106, or on location data received from the plurality of sensors 110. In some embodiments, the plurality of sensors 110 may detect the user 106, the user computer device 118 may report its current location, and/or calendar information may be used to determine the current location of the user 106. Furthermore, the controller 108 may consult the model to determine an expected current location of the user 106 if there is no response from the user computer device 118 and/or sensors 110.

In some further embodiments, the user computer device 118 may report its current location with GPS coordinate information. In other embodiments, the user computer device 118 may report that the user 106 is at the property 104 because the user computer device 118 is still connected to a wireless network at the property 104.

Process 400 may also include receiving 425 energy pricing data for the location associated with the property 104 from an energy company capable of providing energy to the location associated with the property 104. The location associated with the property 104 may be stored in database 510. The location associated with the property 104 may be based upon location data associated with a user computer device 118 of the user 106 associated with the property 104 or on data received from the plurality of sensors.

Process 400 may also include building 430 a model based upon the received input from the user 106, the received property data, the retrieved weather data, and the property usage. The model may be stored in database 510.

Process 400 may also include inputting 435 the received energy pricing data and the retrieved weather data into the model. The model may be stored in database 510.

Process 400 may also include outputting 440 an energy schedule for the property 104, where the energy schedule maintains a temperature of the property 104 within the maximum comfort temperature and the minimum comfort temperature at a minimum cost to the user 106. The energy schedule may be stored in database 510.

Process 400 may also include controlling 445 a temperature of the property 104 using the plurality of sensors 110 and an at least one heating, ventilation, and air conditioning (HVAC) unit based upon the energy schedule. In some embodiments, controller 108 and sensors 110 may be used to control the energy usage of other smart appliances including, for example, washers, dryers, stoves, ovens, microwaves, heated pools, hot tubs, and any other energy using devices In some embodiments, the model may be executed to determine or generate an energy usage plan for the property 104. The energy usage plan includes how and when to activate certain appliances including, but not limited to, HVAC unit 116, vehicle charging units, washers, dryers, dishwashers, lights, ovens, and/or any other appliance that uses electricity. More specifically, the energy usage plan may instruct one or more smart devices in how to change their behavior and when to activate and deactivate to most efficiently and inexpensively use the energy provided by the energy company, any energy generating sources, such as solar panels 120 (shown in FIG. 1), and any energy stored in the energy storage system 112 (shown in FIG. 1).

In at least one embodiment, the model determines the various costs of energy over a period of time, such as a week. The cost of energy may vary based upon time of day, day of week, as well as season and specific weather conditions. The model also determines the weather forecast for the next week as well. The model then uses the weather information to determine energy usage rates in the past for similar weather conditions. The model may also include the calendar for the users 106. For example, the model may determine that the users will be home at 3 PM Monday through Wednesday this week, but will be out until 6 pm on Thursday and Friday. This may be because the user 106 or the user's children have an activity, such as soccer practice, in the afternoon.

Accordingly, based upon the user's schedule, the model determines that it doesn't need to reach the minimum comfort temperature until 3 PM on Monday through Wednesday and at 6 PM on Thursday and Friday. The model may then determine based upon the weather data when to activate the HVAC unit 116 to get the property 104 to a temperature between the minimum comfort temperature and the maximum comfort temperature by the appropriate time while maintaining budgetary constraints. Furthermore, the model may also know that the user will do a load of laundry right after soccer practice. The model may then instruct the smart washer to not activate at 6 PM when energy prices are high, but instead activate at 8 PM when the prices have reduced.

In some embodiments, the model retrieves the user's schedule from the user computer device 118. In other embodiments, the model determines the user's schedule based upon past behavior. In still further embodiments, the model uses a combination of the two.

The model may also determine how much energy is going to be collected for each day based upon the weather data and historical energy generation data. The model may then determine when to collect the excess energy in the energy storage system 122 and when to sell that energy to the electric grid 210 (shown in FIG. 2) based upon energy prices. In some embodiments, the model may determine that energy will be extremely expensive on a specific day and/or time. The model may then ensure that the energy storage system 122 is fully charged, so that no energy is purchased from the grid 210 at that time. For example, at 2 AM, when energy prices are low, the model may instruct the controller 108 to have the energy storage system 122 charge from the electric grid 210 (or solar panels), so that the energy may then be used the next day during the expensive periods of purchasing energy from the grid 210.

In some embodiments, the model may also track minimum and maximum safe temperatures for the property 104. These safe temperatures are tracked to ensure that no harm comes to the property or those within it. For example, in Phoenix, AZ, there may be a maximum safe temperature that needs to not be exceeded before the property is damaged. If it gets too hot certain materials may melt and/or warp. In another example, in Minnesota, the minimum safe temperature may be based upon ensuring that the pipes don't freeze. The minimum and maximum safe temperatures may also be based upon pets and/or plants that the user 106 maintains on the property 104. The temperature during the day may be controlled to ensure that no harms comes to the plants and/or animals while the user 106 is not at the property 104.

In the exemplary embodiment, the controller 108 executes the model to determine how to control the various devices on the property 104.

Exemplary Computer Network

Figure 5:
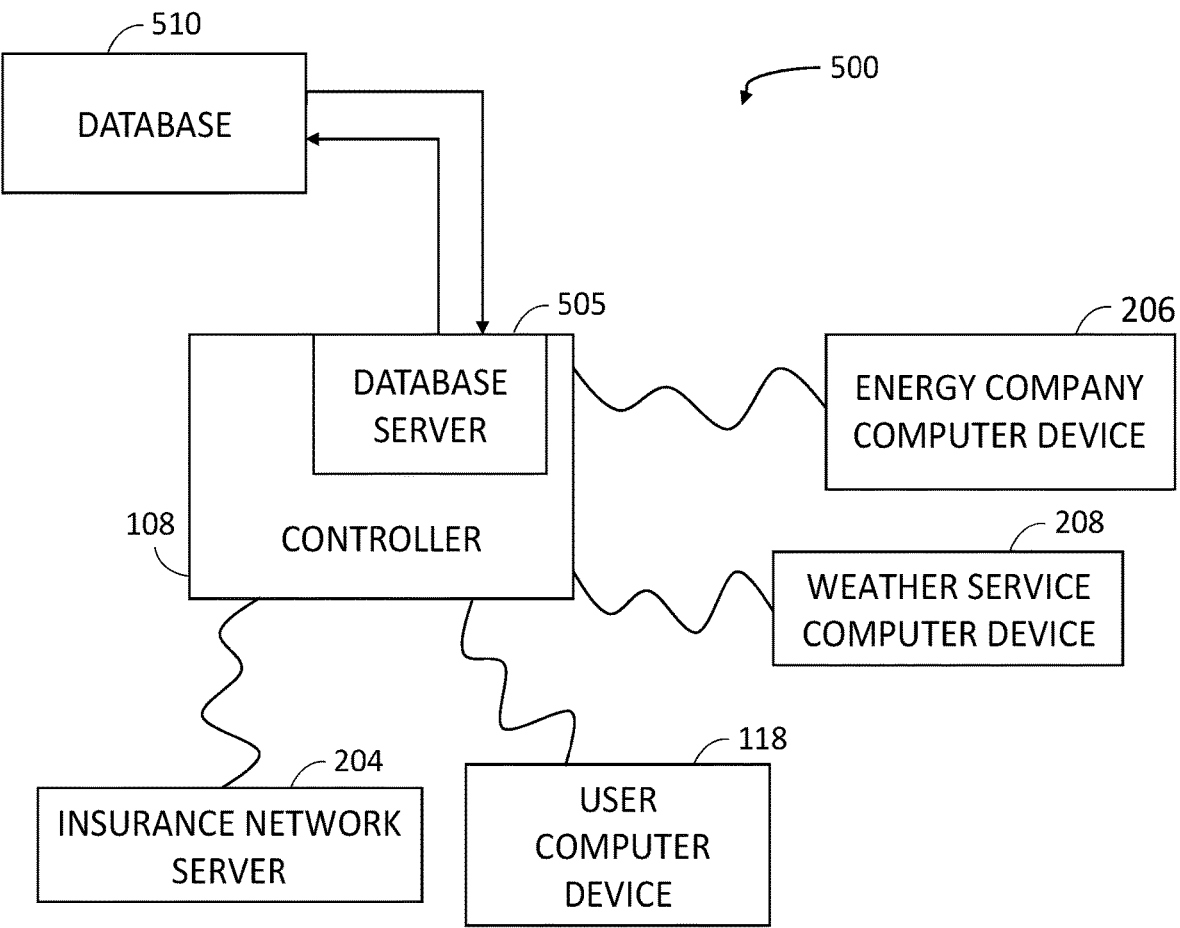
FIG. 5 depicts a diagram of components of one or more exemplary computing devices that may be used in the control system shown in FIG. 1.

FIG. 5 depicts a simplified block diagram of an exemplary computer system 500 for implementing process 400 shown in FIG. 4. In the exemplary embodiment, controller 108 may be used for controlling energy consumption at a property 104. As described below in more detail, a controller 108 may be configured to (i) receive an input from a user 106 associated with the property 104 indicating a maximum comfort temperature and a minimum comfort temperature of the property 104; (ii) receive property data indicating a size of the property 104; (iii) retrieve weather data indicating a weather condition for a location associated with the property 104; (iv) determine property usage indicating a presence of the user 106 at the property 104; (v) receive energy pricing data for the location associated with the property 104 from an energy company capable of providing energy to the location associated with the property 104; (vi) build a model based upon the received input from the user 106, the received property data, the retrieved weather data, and the property usage; (vii) input the received energy pricing data and the retrieved weather data into the model; (viii) output an energy schedule for the property 104, where the energy schedule maintains a temperature of the property 104 within the maximum comfort temperature and the minimum comfort temperature at a minimum cost to the user 106; and/or (ix) control the temperature of the property 104 using the plurality of sensors and an at least one heating, ventilation, and air conditioning (HVAC) unit based upon the energy schedule for the property 104.

In the exemplary embodiment, user computer devices 118 are computers that include a web browser or a software application, which enables user computer devices 118 to access remote computing devices, such as controller 108, electric energy company computer devices 206, and/or weather service computer devices 208, using the Internet or other network. More specifically, user computer devices 118 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 118 may be any device capable of accessing the Internet including, but not limited to, a desktop computer, a laptop computer, a personal digital assistant (PDA), a cellular phone, a smartphone, a tablet, a phablet, wearable electronics, smart watch, virtual headsets (e.g., AR (augmented reality), VR (virtual reality), or XR (extended reality) headsets), chat bots, or other web-based connectable equipment or mobile devices.

A database server 505 may be communicatively coupled to a database 510 that stores data. In one embodiment, database 510 may include input from a user 106 associated with a property 104 indicating a maximum comfort temperature and a minimum comfort temperature of the property 104, property data, a location associated with the property 104, weather data, property usage, energy pricing data, and an energy schedule for the property 104. Database 510 may also include a model based upon the input from the user 106, the received property data, the retrieved weather data, and the property usage. In the exemplary embodiment, database 510 may be stored remotely from controller 108. In some embodiments, database 510 may be decentralized.

Controller 108 may be communicatively coupled with one or more user computer devices 118. In some embodiments, controller 108 may be associated with, or may be part of, a computer network associated with an insurance provider, or in communication with insurance network server 204. In other embodiments, controller 108 may be associated with a third party and may merely be in communication with the insurance network server 204. More specifically, controller 108 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Controller 108 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Controller 108 is capable of communicating with energy company computer devices 206, weather service computer devices 208, and insurance network server 204 through an application programming interface (API). Controller 108 may also use APIs to communicate with outside applications, such as, but not limited to, data sources about the weather, data sources about energy pricing, access to law enforcement and/or state laws governing automobile insurance policies, and other applications as necessary.

In the exemplary embodiment, insurance network servers 204 include one or more computing devices associated with an insurance provider. In the exemplary embodiment, insurance provider is associated with the policyholder (user 106, shown in FIG. 1) and the policyholder has a property insurance policy that insures his or her property 104 with insurance provider. In the exemplary embodiment, insurance network servers 204 include a web browser or a software application, which enables insurance network server 204 to access remote computing devices, such as controller 108 and database server 505, using the Internet or other network. More specifically, insurance network servers 204 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Insurance network servers 204 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, insurance network servers 204 may access database 510 to review input from a user 106 associated with a property 104 indicating a maximum comfort temperature and a minimum comfort temperature of the property 104, property data, a location associated with the property 104, weather data, property usage, energy pricing data, and/or an energy schedule for the property 104.

In the exemplary embodiment, electric energy company computer devices 206 include computing devices associated with energy companies capable of providing energy to the location of the property 104 associated with the policyholder. More specifically, energy company computer devices 206 may provide energy pricing information such as the price of energy at specific times and/or on specific days. In the exemplary embodiment, energy company computer devices 206 include a web browser or a software application, which enables energy company computer devices 206 to access remote computing devices, such as controller 108, using the Internet or other network. More specifically, energy company computer devices 206 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

Energy company computer devices 206 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. Energy company computer devices 206 may communicate with controller 108 and provide information such as the price of electric energy at specific times and/or on specific days. Energy company computer devices 206 may communicate with database 510 to receive information about the policyholder, information related to the weather, information related to the energy pricing, information related to the energy usage at the property 104 associated with the policyholder, and information related to the energy schedule of the property 104.

In the exemplary embodiment, weather service computer devices 208 include computing devices associated with weather services capable of providing weather services to the location of the property 104 associated with the policyholder. More specifically, weather service computing devices 530 may provide weather information such as the temperature and amount of cloud cover at specific times and/or on specific days. In the exemplary embodiment, weather service computer devices 208 include a web browser or a software application, which enables weather service computer devices 208 to access remote computing devices, such as controller 108, using the Internet or other network. More specifically, weather service computer devices 208 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Weather service computer devices 208 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Weather service computer devices 208 may communicate with controller 108 and provide information such as the temperature and amount of cloud cover at specific times and/or on specific days. Weather service computer devices 208 may communicate with database 520 to receive information related to the location associated with the property 104 associated with the policyholder, information related to the weather condition, information related to the energy pricing, information related to the energy usage at the property 104 associated with the policyholder, and information related to the efficient energy usage schedule of at least one electric appliance associated with the property 104.

Exemplary Client Device

Figure 6:
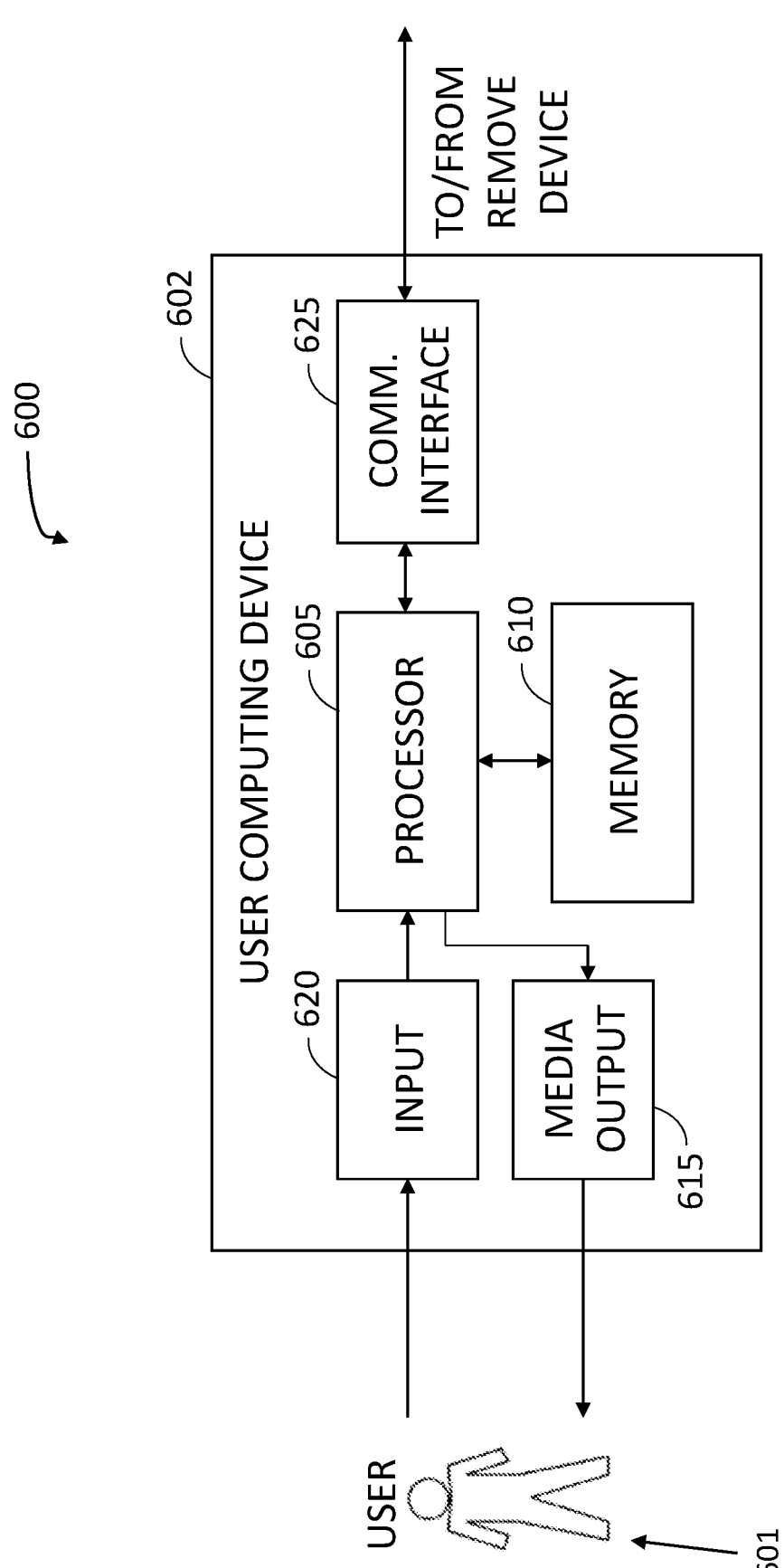
FIG. 6 illustrates an exemplary configuration of a user computing device that may be used with the control system shown in FIG. 1, in accordance with one embodiment of the present disclosure.

FIG. 6 depicts an exemplary configuration 600 of user computing device 602, in accordance with one embodiment of the present disclosure. In the exemplary embodiment, user computing device 602 may be similar to, or the same as, user computer device 118 (shown in FIG. 5). User computing device 602 may be operated by a user 601. User computing device 602 may include, but is not limited to, user computer devices 118, energy company computer device 206, weather service computer device 208, and insurance server 204 (all shown in FIG. 2). User computing device 602 may include a processor 605 for executing instructions. In some embodiments, executable instructions may be stored in a memory area 610. Processor 605 may include one or more processing units (e.g., in a multi-core configuration). Memory area 610 may be any device allowing information such as executable instructions and/or transaction data to be stored and received. Memory area 610 may include one or more computer readable media.

User computing device 602 may also include at least one media output component 615 for presenting information to user 601. Media output component 615 may be any component capable of conveying information to user 601. In some embodiments, media output component 615 may include an output adapter (not shown) such as a video adapter and/or an audio adapter. An output adapter may be operatively coupled to processor 605 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 615 may be configured to present a graphical user interface (e.g., a web browser and/or a client application) to user 601. A graphical user interface may include, for example, an interface for viewing maximum comfort temperatures of the property 104, minimum comfort temperatures of the property 104, property data, weather data, property usage, energy pricing data, an energy schedule for the property 104, and other information. In some embodiments, user computing device 602 may include an input device 620 for receiving input from user 601. User 601 may use input device 620 to, without limitation, select and/or enter one or more items of information about a maximum comfort temperature of the property 104, a minimum comfort temperature of the property 104, a location of the property 104, and property usage.

Input device 620 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 615 and input device 620.

User computing device 602 may also include a communication interface 625, communicatively coupled to a remote device such as controller 108 (shown in FIG. 5). Communication interface 625 may include, for example, a wired or wireless network adapter and/or a wireless data transceiver for use with a mobile telecommunications network.

Stored in memory area 610 are, for example, computer readable instructions for providing a user interface to user 601 via media output component 615 and, optionally, receiving and processing input from input device 620. A user interface may include, among other possibilities, a web browser and/or a client application. Web browsers enable users, such as user 601, to display and interact with media and other information from controller 108. A client application may allow user 601 to interact with, for example, controller 108. For example, instructions may be stored by a cloud service, and the output of the execution of the instructions sent to the media output component 615.

Exemplary Server Device

Figure 7:
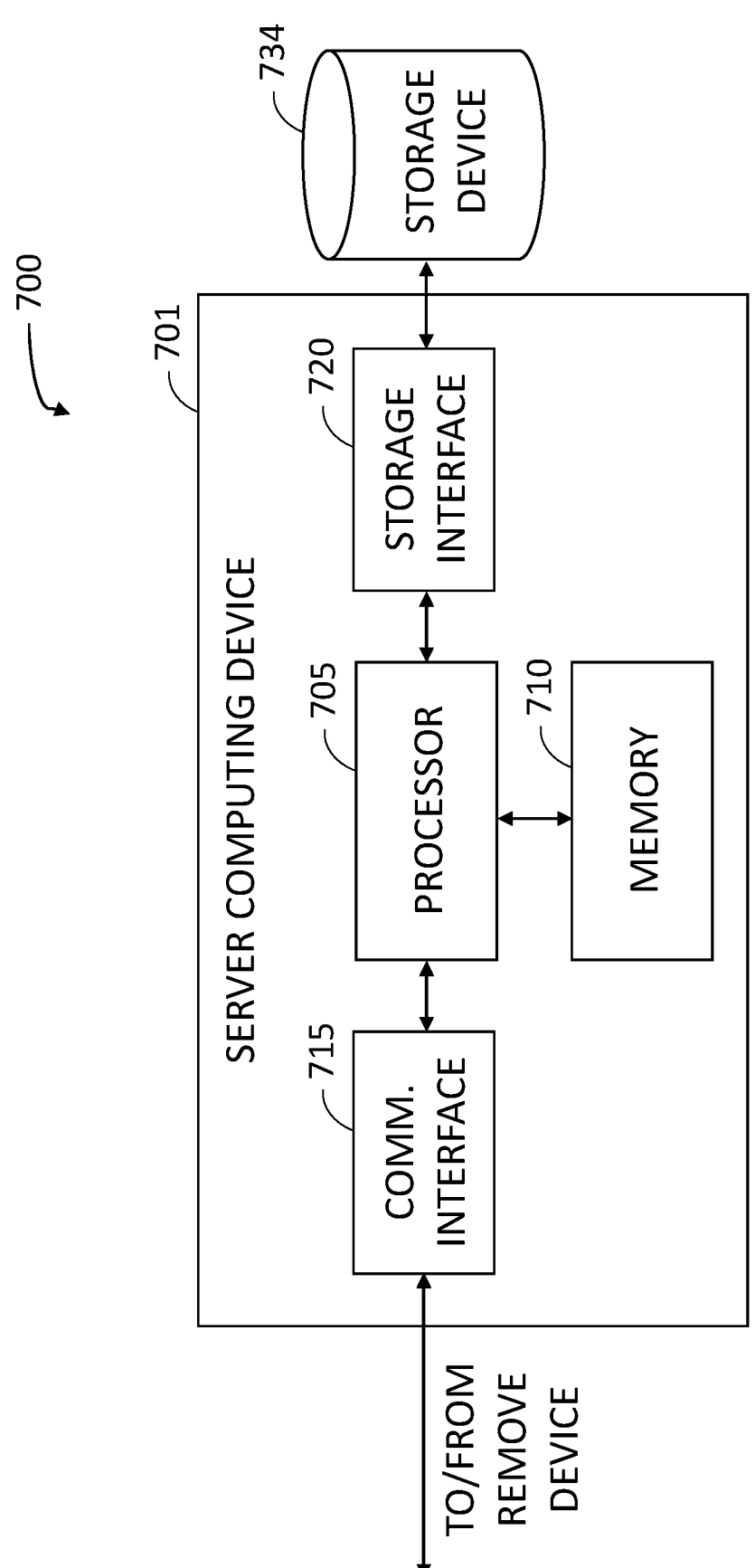
FIG. 7 illustrates an exemplary configuration of a server system that may be used with the control system shown in FIG. 1, in accordance with one embodiment of the present disclosure.

FIG. 7 depicts an exemplary configuration 700 of a server computing device 701, in accordance with one embodiment of the present disclosure. In the exemplary embodiment, server computing device 701 may be similar to, or the same as, controller 108 (shown in FIG. 5). Server computing device 701 may include, but is not limited to, controller 108, energy company computer device 206, weather service computer device 208, insurance server 204 (all shown in FIG. 2), and database server 505 (shown in FIG. 5). Server computing device 701 may also include a processor 705 for executing instructions. Instructions may be stored in a memory area 710. Processor 705 may include one or more processing units (e.g., in a multi-core configuration).

Processor 705 may be operatively coupled to a communication interface 715 such that server computing device 701 is capable of communicating with a remote device such as another server computing device 701, controller 108, energy company computer devices 206, weather service computer devices 208, insurance network server 204, and user computer devices 118 (for example, using wireless communication or data messages over one or more radio links or digital communication channels). For example, communication interface 715 may receive requests from user computing devices 118 via the Internet, as illustrated in FIG. 5.

Processor 705 may also be operatively coupled to a storage device 734. Storage device 734 may be any computer-operated hardware suitable for storing and/or receiving data, such as, but not limited to, data associated with database 510 (shown in FIG. 5). In some embodiments, storage device 734 may be integrated in server computing device 701. For example, server computing device 701 may include one or more hard disk drives as storage device 734.

In other embodiments, storage device 734 may be external to server computing device 701 and may be accessed by a plurality of server computing devices 701. For example, storage device 734 may include a storage area network (SAN), a network attached storage (NAS) system, and/or multiple storage units such as hard disks and/or solid state disks in a redundant array of inexpensive disks (RAID) configuration.

In some embodiments, processor 705 may be operatively coupled to storage device 734 via a storage interface 720. Storage interface 720 may be any component capable of providing processor 705 with access to storage device 734. Storage interface 720 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 734.

Processor 705 may execute computer-executable instructions for implementing aspects of the disclosure. In some embodiments, the processor 705 may be transformed into a special purpose microprocessor by executing computer-executable instructions or by otherwise being programmed. For example, the processor 705 may be programmed with the instruction such as illustrated in FIG. 4.

Exemplary Computing Device

Figure 8:
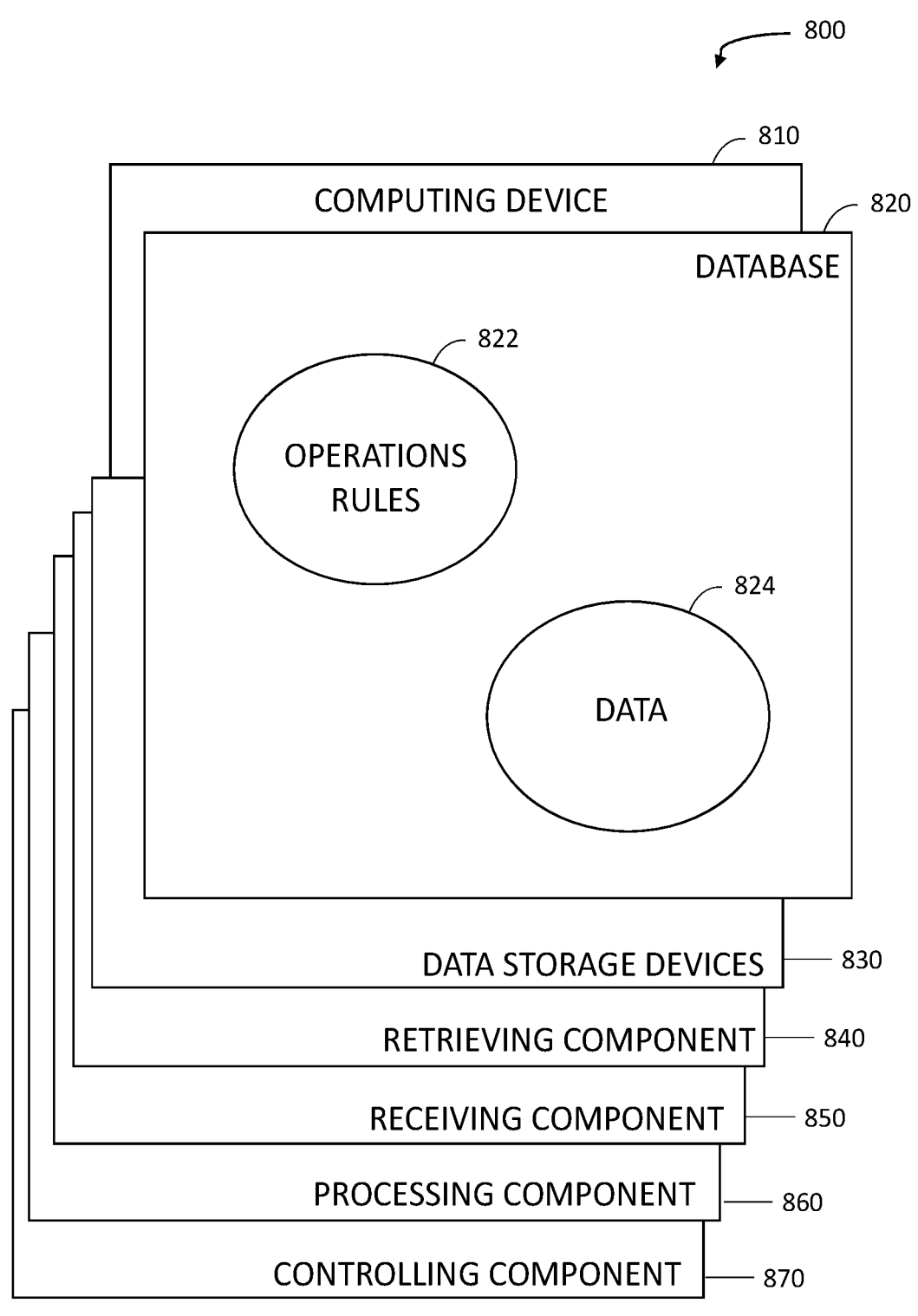
FIG. 8 illustrates a diagram of components of one or more exemplary computing devices that may be used in the control system shown in FIG. 5.

FIG. 8 depicts a diagram 800 of components of one or more exemplary computing devices 810 that may be used in system 500 shown in FIG. 5. In some embodiments, computing device 810 may be similar to controller 108. Database 820 may be coupled with several separate components within computing device 810, which perform specific tasks. In this embodiment, database 820 may include the operations rules 822 and data 824. In some embodiments, database 820 is similar to database 510 (shown in FIG. 5).

Computing device 810 may include the database 820, as well as data storage devices 830. Computing device 810 may also include a retrieving component 840 for retrieving 415 (shown in FIG. 4) weather data indicating a weather condition for a location associated with the property 104 (shown in FIG. 1). Computing device 810 may also include a receiving component 850 for receiving 405 an input from a user associated with the property 104 indicating a maximum comfort temperature and a minimum comfort temperature of the property 104, receiving 410 property data indicating a size of the property 104, and receiving 425 energy pricing data for the location associated with the property 104 from an energy company capable of providing energy to the location associated with the property 104 (shown in FIG. 4).

Computing device 810 may also include a processing component 860 for determining 420 property usage indicating a presence of the user at the property 104, building 430 a model based upon the received input from the user, the received property data, the retrieved weather data, and the property usage, inputting 435 the received energy pricing data and the retrieved weather data into the model, and outputting 440 an energy schedule for the property 104, where the energy schedule maintains a temperature of the property 104 within the maximum comfort temperature and the minimum comfort temperature at a minimum cost to the user (shown in FIG. 4). Computing device 810 may also include a controlling component 870 for controlling 445 a temperature of the property 104 using a plurality of sensors and an at least one heating, ventilation, and air conditioning (HVAC) unit based upon the energy schedule (shown in FIG. 4). Processing component 860 may assist with execution of computer-executable instructions associated with the system.

Exemplary Internal Source Devices within the Home

Figure 9:
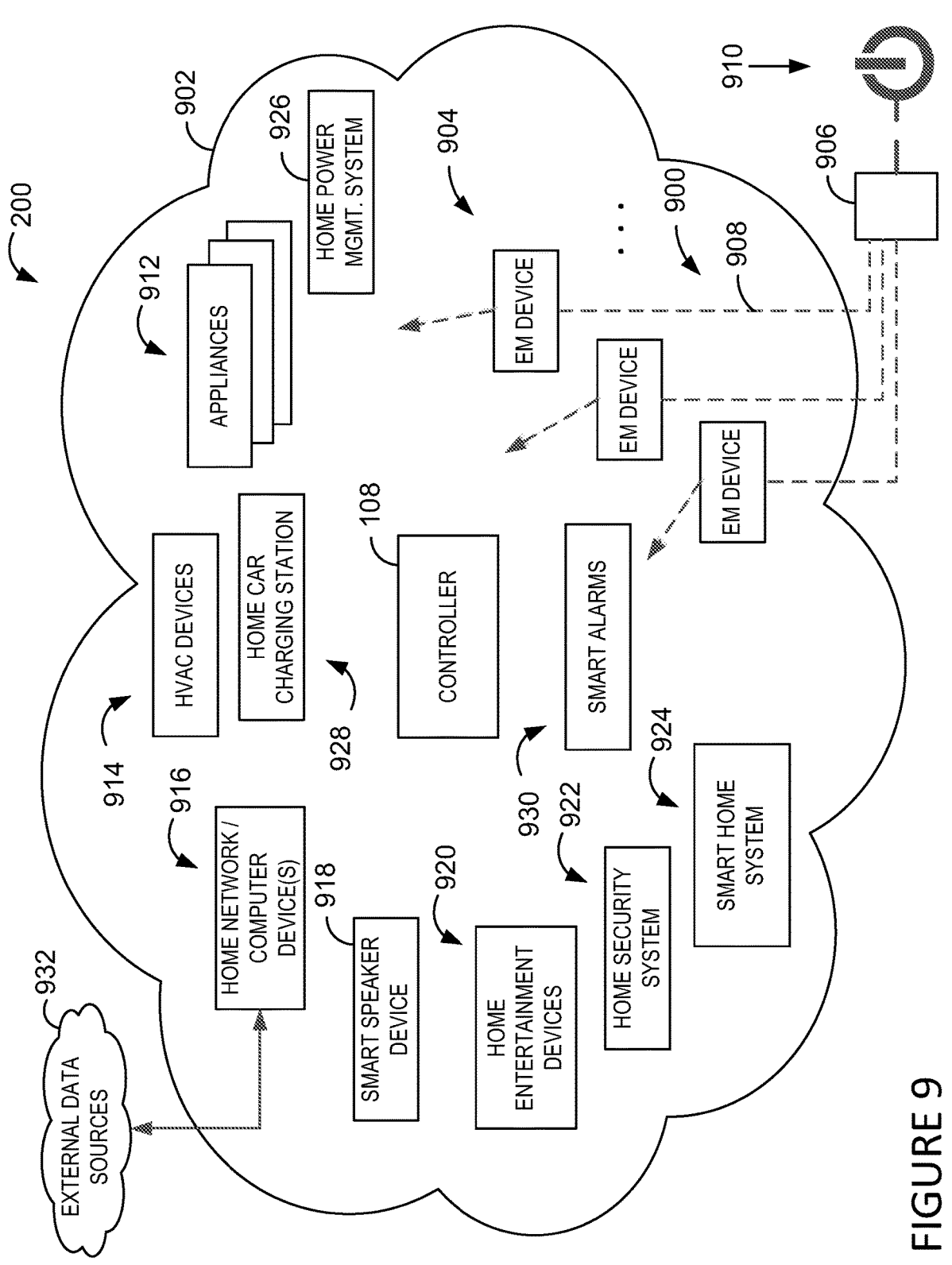
FIG. 9 illustrates exemplary source devices that may be used with the exemplary smart energy platform shown in FIG. 1.

FIG. 9 illustrates exemplary source devices that may be used with the exemplary smart energy platform 100 shown in FIG. 1. In the exemplary embodiment, the controller 108 is in communication with or otherwise monitors or collects data from a variety of source devices within a home network 902. The property 104, and the various source devices therein, may be powered by an electrical distribution system 900 within environment 200. Paths of electrical power flow are illustrated in FIG. 9 in broken line. The electrical distribution system 900 includes multiple electrical circuits 908, each of which may provide power to one or more of the source devices or other electrical devices within the property 104. Each of the example circuits 908 emanate from an electrical distribution panel 906 that receives power from a power source 910, such as a utility power company or an on-premise power source (e.g., gas generator, solar generator, wind generator). Each circuit 908 may include a circuit breaker for each circuit 908 in the electrical distribution panel 906. While not expressly shown, any of the various source devices may be connected to and powered by the electrical circuits 908.

In the exemplary embodiment, the smart energy platform 100 may include one or more electricity monitoring ("EM") devices 904. EM devices 904 may be used to monitor electricity flowing to individual electric devices, such as smart devices or appliances, electronics, vehicles, or mobile devices, and may be configured to monitor or detect abnormal usage or trends. Abnormal electricity flow ("EF") to various devices may indicate that failure is imminent, maintenance or device replacement is needed, de-energization is recommended, or other corrective actions are prudent. For example, the EM devices 904 may be TING® smart sensors such as those made commercially available by Whisker Labs of Germantown, MD.

EF data collected by the EM devices 904 may include data indicative of electricity flow to or from various smart or other electronic devices, including the various devices shown here in FIG. 9. EF data may also include electricity or energy usage for each electronic component, device, outlet, circuit, or the like, within the property 104, such as data indicating the electricity each device or room is using. For example, energy usage of air conditioners, washers, dryers, dish washers, refrigerators, stoves, ovens, microwave ovens, televisions, lamps, outlets, computers, laptops, mobile devices, other electronic devices, may be determined by the EM device 904. EF data may be used to detect hazards or other abnormalities that may indicate a risk to the property 104 or its assets. EF data may also be used to detect energy usage at the property 104.

EM devices 904 may include sensors that are configured to monitor and collect EF data. EM devices 904 may be plugged into electrical outlets within the home (e.g., conventional 110-volt outlets) for at least powering the device 904, or may be electrically wired into a circuit 908 for powering the device 904. Further, some EM devices 904 may collect EF data directly from a circuit 908 (e.g., via wired connection to the circuit 908, referred to herein as "direct sensing") and some EM devices 904 may wirelessly collect EF data from circuits 908, appliances, or other electricity consuming devices (referred to herein as "wireless sensing"). Wireless sensing may include, for example, sensors within the EM device 904 that are configured to sense electromagnetic waves or an electrical signature of the electrical devices receiving power from the electrical distribution system 900.

The EM devices 904 may directly or wirelessly detect each flow of electricity to or from each different electronic device by identifying each electronic device by its unique electronic or electrical signature (or "fingerprint"). The EM devices 904 may then generate electricity usage or flow data for each electronic device within the home, or connected to the electrical distribution system 900 (such as a hybrid or fully electric vehicle having its battery directly or wirelessly charged by the home's electrical system). In some embodiments, EM devices 904 may be positioned in vicinity of the electrical distribution panel 906 and may capture electrical activity about the property 104 by wirelessly detecting an electricity flow to devices that are coupled to the electrical distribution board 906.

In other embodiments, EM devices 904 may be positioned in vicinity of the electrical distribution panel 906, but not hardwired to the electrical distribution panel 906 or home electrical wiring system, and may capture electrical activity about the property 104 by wirelessly detecting an electricity flow to devices that are coupled to the electrical distribution board 906. In other embodiments, EM devices 904 may be plugged into electrical outlets positioned throughout a home.

During operation, as one or more of the electric devices receives electricity via the electrical distribution system 900, each device may be differentiated by an electrical signature that is unique to a respective device (such as by one or more EM devices 904 monitoring, detecting, and/or analyzing the electricity flowing to or being consumed by each respective electric device, and/or by monitoring EF data generated or collected by one or more EM devices 904).

In other words, transmission of electricity to a refrigerator, for example, may be differentiated from transmission of electricity to an electric stove (such as via one or more EM devices 904 and/or analyzing the EF data generated or collected by one or more EM devices 904). Furthermore, transmission of electricity to a television on one circuit 908 or outlet, for example, may be differentiated from transmission of electricity to another recipient electric device (e.g., a cable television box) via the same circuit 908 or electrical outlet. The smart energy platform 100 may correlate electrical activity with a variety of electric devices on the electrical distribution system 900 based upon electrical signatures unique to each respective device. The smart energy platform 100 may build a structural electrical profile for the property 104, which may include data indicative of operation of the various electric devices within or around the property 104 (e.g., over a period of time), such as by using EF data generated or collected by one or more EM devices 906 over a period of time.

In some embodiments, an EM device 904 may be affixed to or situated near the electrical distribution panel 906. Generally, the EM device 904 may utilize the unique, differentiable electrical signatures of the electric devices by directly or wirelessly monitoring electrical activity including transmission of electricity via the electrical distribution panel 906 to one or more of the electric devices. Monitoring of transmission of electricity to an electric device receiving the electricity may include, for example, monitoring (i) the time at which the electricity was transmitted, (ii) the duration for which the electricity was transmitted, and/or (iii) the magnitude of the electric current in the transmission.

Based upon the unique electrical signatures of the various electric devices of the property 104, the monitored electrical activity may be correlated with respective electric devices receiving the electricity transmitted via the electrical distribution system 900. Further, electrical activity associated with other components of the electrical distribution system 900 (e.g., the electrical distribution panel 906, the circuits 908, or the like) may be correlated with one or more electric devices to which the electrical activity also pertains.

In some embodiments, the EM device(s) 904 may perform the correlation or other functions described herein, via one or more processors of the EM device(s) 904 that may execute instructions stored at one or more computer memories of the EM devices 904. In other embodiments, the EM devices 904 may collect the EF data, and the correlation and/or other functions described herein may be performed at another system (e.g., the controller 108), which may receive data or signals indicative of monitored electricity or other data via one or more processors or through transfer via a physical medium (e.g., a USB drive). Correlation of the electrical activity with the respective electrical devices may produce data indicating, for example, the time, duration, and/or magnitude of electricity consumption by each of the electric devices during a period of electrical activity monitoring.

Based upon at least the correlated electrical activity, a structure electrical profile may be built and stored at the EM devices 904 or at some other system (e.g., the controller 108). The structure electrical profile may include, for each of the electric devices about the property 104, data indicative of operation of the respective electric device during at least the period at which the EM devices 904 monitored electrical activity about the property 104. Based upon the correlated electrical activity, the structure electrical profile may depict, for example, average electricity operation/usage, baseline electricity operation/usage, and/or expected electricity operation/usage/consumption. In effect, the structure electrical profile, based upon real electrical activity about the structure, may set forth what is "normal" operation and usage of electricity about the structure.

Thus, once the structure electrical profile is built, any electrical activity monitored via the controller 108 and the EM device(s) 904 may be analyzed to determine whether electrical activity is abnormal. In response to the abnormal electrical activity, among other possible factors, corrective actions mitigate damage, prevent damage, and/or remedy the cause of the abnormal electrical activity the situation may be determined and/or initiated. Some possible corrective actions are discussed herein.

EF data regarding an electric device may include, for example, historical data indicating the electric device's past operation patterns or trends. For example, historical data may indicate a time of day, day of the week, time of the month, etc., at which an electric device frequently uses electricity (e.g., a lighting fixture may not use electricity during late night hours of the day). As another example, historical data may include the electric device's total electricity consumption or usage rate over a period of time. Additionally or alternatively, historical data may include data indicating past events regarding the electric device (e.g., breakdowns, power losses, arc faults, etc.).

Additionally or alternatively, operation data regarding an electric device may include an expected electricity consumption or baseline electricity consumption for the electric device. For example, in the case of a refrigerator, the refrigerator's electricity consumption during a first period of monitoring may be reliably used to approximate an expected electricity consumption at a later time.

Further, the structure electrical profile may include data pertaining to the structure as a whole. For example, the structure electrical profile may include data reflecting a total electricity or average usage rate over a period of time. As another example, the profile may include time-of-day, day-of-week, etc., data reflecting times at which the property 104 as a whole uses more or less electricity. Further, the profile may detail specific types, classes, or specifications of electric devices that behave differently or consume a different amount of electricity compared to other electric devices within the property 104. Further, the profile may detail specific risks determined to be relevant to one or more of the electric devices or to the property 104 as a whole, based upon the electrical activity of the electric devices.

Furthermore, the structure electrical profile may include a digital "map" of the property 104. A home map may indicate spatial locations of the electric devices, and/or spatial relationships between two or more of the electric devices. Such mapping may indicate, for example, a risk associated with the spatial placement of a stove, and/or a risk associated with placing a refrigerator adjacent to the stove. Additionally or alternatively, the home map may indicate which of the electric devices are connected to each electrical circuit 908 within the electrical distribution system 900 of the property 104. Such mapping may indicate, for example, a risk of overloading a particular circuit 908 based upon a number or intensity of electric devices connected to the circuit 908. As another example, the home map may be used to determine what electric devices may lose power if a particular circuit 908 were to be de-energized (e.g., due to risk or abnormal electrical activity associated with one electric device on the circuit).

In some embodiments, the home map may be configurable by a user (e.g., the homeowner of the property 104). The user may, for example, configure the map via an I/O module (e.g., screen, keypad, mouse, voice control, etc.) of the controller 108, or via an I/O module of another computing device, which may transmit the home map to the controller 108. Additionally or alternatively, the home map may be stored at one or more computer memories of another system (e.g., hub 202 (shown in FIG. 2)).

In some embodiments, the home network 902 may include a home power management system 926. The home power management system 926, or the controller 108 in conjunction with the EM devices 904, may collect power consumption data on the circuits 908 (e.g., via EM devices 904) or device electrical usage data of various electronic devices within the property 104. The home power management system 926 may, for example, collect usage data for lights or appliances within the property 104, giving an indication of how much electricity the property 104 uses or how frequently occupants are at home. In some embodiments, the property 104 may include one or more smart plugs (not separately shown) which may be managed by the power management system 926, the smart speaker device 918, the smart home system 924, or otherwise by the smart energy platform 100 (e.g., for activating or deactivating devices plugged into the circuits 908 via the smart plugs, such as via 110-volt outlets).

The home power management system 926 may identify and provide details on what appliances or other consuming devices are within the property 104 (e.g., manufacturer make and model), thereby allowing the smart energy platform 100 to identify some property on the premises (e.g., device identification and verification, device count), evaluate value of devices (e.g., replacement costs), or collect manufacturer-provided or consumer protection-provided details regarding the devices from external data sources 932 (e.g., susceptibility of the device to power surges, likelihood of fire caused by the device, mean time to failure of the device, types of device failures, power consumption profiles and tolerances of the device, or the like).

The home power management system 926 may collect power quality data for the property 104, such as occurrences and frequency of power outages or reductions in service (e.g., black-outs or brown-outs), loading at various times throughout the day or week, the size of service, occurrences of voltage values fluctuating beyond tolerance ranges (e.g., spikes), or the like. In some embodiments, the home power management system 926 may include one or more smart circuit breakers (e.g., on any or all of the circuits 908) or a smart panel (e.g., as the electrical distribution panel 906), such as those made commercially available by Schneider Electric (Paris, France), which may provide circuit-level data and operations such as, for example, current or historical circuit load data, circuit breaker status, or turning circuit breakers on or off. Such power data may be used to construct a power profile for the property 104. In some embodiments, the controller 108 may perform any such power monitoring and data collection operations in lieu of, or in addition to, the home power management system 926.

In the exemplary embodiment, the property 104 may include one or more smart appliances 912 (e.g., appliances that may communicate via the home network 902). Smart appliances 912 may include, for example, dish washers, microwaves, stove tops, ovens, grills, clothes washers and dryers, water heater, water meter, water softener or purifier, smart lighting, smart window blinds or shutters, piping, interior or yard sprinklers, or the like. The controller 108 may be configured to communicate with such smart appliances 912 and may collect internal data from such appliances for the smart energy platform 100.

For example, the appliances 912 may provide data such as device data (e.g., manufacturer, make, model, date of manufacturer, date of installation, software or firmware versions), usage data (e.g., daily usage time, power consumption), or log data (e.g., log events, alerts, component failure detections, maintenance history, or the like). Such appliance data may allow the smart energy platform 100 to detect which appliances are present in the property 104 (broadly, as a part of an "asset inventory" of the house), their replacement value, age of each appliance, a maintenance history of each appliance, to detect when appliances or their components are failing.

The smart energy platform 100 may use such data, for example, to construct the power profile for the property 104, to compute the safety score for the property 104, to compute in an insurance profile for the home (e.g., as factors of risk to lightning or other hazards), or to alert the homeowners when an appliance registers a failure.

In the exemplary embodiment, the property 104 may also include smart HVAC devices such as, for example, a heater (e.g., a gas or electric furnace), an air conditioner, an air purifier, an attic fan, a ceiling fan. Some or all such devices may be controlled by a thermostat device. Such devices are collectively referred to herein as HVAC devices 914, some of which may not be smart devices but may nonetheless be controlled in some aspects by the thermostat device.

The smart energy platform 100 may collect HVAC data such as device data (e.g., manufacturer, make, model, date of manufacturer, date of installation), usage data (e.g., daily usage time, power consumption), or thermostat data (e.g., temperature settings, daily schedule profiles). The smart energy platform 100 may use such data, for example, to construct the power profile for the property 104, to compute the safety score for the property 104 (e.g., determining how often the property 104 is typically occupied), to compute in an insurance profile for the home (e.g., as factors of risk to lightning or other hazards, likelihood of equipment failures), or to alert the homeowners when an HVAC device registers a failure.

The property 104, in the exemplary embodiment, may also include various computing devices such as, for example, desktop or laptop personal computers, tablet computers, servers, or networking devices (e.g., Wi-Fi routers, switches, hubs, firewalls, or the like), all of which are collectively represented here as home network/computer devices (or just "computer devices") 216. The networking devices may provide some or all of the home network 902 that is used to facilitate communication between the devices shown here. The controller 108 may be configured to capture computer device data from some or all of these computer devices 916 such as, for example, a number and type of computing devices (e.g., hardware manufacturer, make, model, and the like), hardware and software profile of computing devices, configuration data of computing devices (e.g., software versions, firmware versions), usage data, and log data (e.g., firewall logs, access logs, software patch logs, error logs). The smart energy platform 100 may use such data to, for example, determine asset inventory and valuation, construct the power profile for the property 104 (e.g., average daily usage), alert the homeowners when devices need software or firmware upgrades (e.g., critical security alerts) or upon intrusion detection or other compromise of computer devices 916 (e.g., software hacks).

In the exemplary embodiment, the property 104 may include a smart speaker device(s) (or "nest device") 918 that may interact with occupants of the property 104 (e.g., via audible commands and responses, digital display, executing pre-configured actions). Some example smart speaker devices 918 include the Echo® devices (Amazon Inc., of Seattle, Washington) and the Google Nest® devices (Alphabet Inc., of Mountain View, California), to name but a few. The smart speaker device 918 may include a speaker for providing audio output, a microphone for receiving audio input (e.g., commands spoken by the occupants), and may include a display device for video output or a camera device for capturing video input. The smart speaker device 918 may be configured to interact with other smart devices, such as for controlling lighting within the property 104, the thermostat (e.g., changing thermostat settings), home security devices of a home security system 920 (e.g., locking and unlocking smart locks on doors, opening or closing garage doors, or the like), or entertainment devices of a home entertainment system 926 (e.g., enabling, disabling, or reconfiguring music or television devices).

The smart energy platform 100 may, with owner configuration and permission, utilize inputs from the smart speaker device 918 to, for example, determine a number of unique occupants of the property 104 (e.g., via unique speech profile or video identification), determine the number of children in the property 104 (e.g., via audio or video analysis), determine when occupants of the property 104 are currently or historically present (e.g., via noise detection, video movement), determine when other devices are turned on or off, determine presence of pets (e.g., via unique audio sounds or video identification of the pets), or smoke or carbon monoxide alarm detection (e.g., via audible sound). Such raw data may be sanitized or distilled by the controller 108 into refined data before sending to the hub 202 in an effort to protect privacy of the home occupants while still providing home health evaluation and risk capabilities (e.g., sending results determined from the raw audio or video data and deleting the raw audio or video data). The smart energy platform 100 may anonymize personal data, thereby allowing data to be stored or used without direct attribution of data to a particular homeowner.

In the exemplary embodiment, the property 104 may include various home entertainment devices 920 such as, for example, televisions, digital video recorders ("DVR"), radios, amplifiers, speakers, remotes, or console gaming systems, any or all of which may be smart devices in communication with the home network 902 and the controller 108. The controller 108 may collect home entertainment data from such devices and may use that data, for example, to construct the power profile for the property 104.

The property 104, in the exemplary embodiment, may include a home security system 922. The home security system 922 may include security devices such as, for example, door or window sensors (e.g., to detect when doors or windows or open, when windows are broken), motion sensors (e.g., to detect when someone is present within range of the sensor), security cameras (e.g., for capturing audio/video of particular areas in or around the structure on the property 104, such as a doorbell camera), key pads (e.g., for enabling/disabling the security system), panic buttons (e.g., for alerting a security service or authorities of an emergency situation), security hubs (e.g., for integrating individual security devices into a security system, for centrally controlling such devices, for interacting with third parties), electric door locks, or smoke/fire/carbon monoxide detectors. Such "security devices" broadly represent devices that may detect potential contemporaneous risks to the property 104 or its occupants (e.g., intrusion, fire, health).

The home security system 922 may be configured to communicate with a third-party security service or local authorities, and may transmit alerts to such parties when events are detected. The controller 108 may be configured to receive alert data from the home security system 922 and may transmit such alerts to the hub 202 (shown in FIG. 2), create historical logs of security events, or transmit alert events directly to the homeowner (e.g., via SMS text message or the like) or to local authorities, fire protection, or emergency services. The smart energy platform 100 may use such security alert events to, for example, determine how frequently security events occur (e.g., as a factor for risk), how often such events are warranted (e.g., authentic risks rather than false alarms), or the type and nature of such authentic risks or false alarms.

The smart energy platform 100 may use raw data collected directly from any of these security devices. For example, the controller 108 may use raw data from the motion sensors to detect when the property 104 is occupied (e.g., to build a profile of occupancy times), may use raw data from the camera devices or door devices to detect when occupants enter or exit the property 104, may use the camera devices to determine a number of occupants of the property 104 or a number and type of pets in the property 104. The controller 108 may determine information about the home security system 922 installed within the home, such as a number and type of security sensors installed within the property 104, a type of home security system 922 installed in the home (e.g., third-party service provider, device manufacturers, types of security protection implemented within the home), or how often the homeowners leave the property 104 unoccupied without activating the home security system 922 (e.g., as a factor in risk calculations or home health scoring).

In some embodiments, the property 104 may include a smart home system 924 (e.g., a home monitoring system) that allows the homeowner and occupants to control various devices within the property 104. For example, the smart home system 924 may be configured to control, inter alfa, devices such as the smart appliances 912, HVAC devices 914, home entertainment devices 920, or home security system 922.

In the exemplary embodiment, the controller 108 may be configured to interact directly with such devices as described herein ("direct access"), or may be configured to perform some interactions and data collections with such devices through the smart home system 924 ("proxy access"). For example, any or all of the data collections or operations described herein may be performed by the smart home system 924 based upon commands received from the controller 108, thereby allowing the smart energy platform 100 to perform such operations through the smart home system 924 acting as a proxy for some such operations.

In the exemplary embodiment, the property 104 may include a home car charging station 928 that may be used to recharge electric vehicles (not separately shown). The home car charging station 928 may draw power from one or more of the circuits 908 of the electrical distribution system 900 and may include an on-premise power source (e.g., solar panels, wind generator, or the like) or a dedicated battery bank (e.g., for storing excess power from the local energy source). The smart energy platform 100 may capture various charging station data from the home car charging station 928, from the circuits 908 used for the charging station 928, or from the local power source device(s).

For example, the controller 108 may collect device information from the devices (e.g., manufacturer, make, model), vehicle information (e.g., via wireless connection with the vehicle to collect manufacturer, make, model, year of manufacture, options, software versions, usage, miles driven, battery health information, vehicle health information), or power information (e.g., recharging statistics, power used, power generated, recharging history). Such information may be used, for example, to build the power profile, to determine when the vehicle(s) are on the premises, to determine asset inventory, or to determine power inefficiencies related to recharging (e.g., cost analysis of utility power use versus local power generation and storage relative to when the vehicle(s) are on the premises).

In the exemplary embodiment, the property 104 may include one or more smart alarms 930 that are configured to detect various conditions within the property 104 and may alert the homeowner or other occupants (e.g., via audible alarm, SMS text message, email, or the like). Smart alarms 930 may include, for example, smoke detectors, carbon monoxide detectors, carbon dioxide detectors, or indoor air quality ("IAQ") monitors or systems that include sensors configured to, for example, detect dangerous conditions such as fire or buildup of carbon monoxide, the presence of dangerous pollutants such as radon or various volatile organic compounds ("VOC"), or collect various air quality data such as temperature and humidity.

Smart alarms 930 may include water leak detectors or flood alarms that may be configured to detect the presence of water at various areas in the property 104, such as near HVAC equipment, water tanks, sump pumps, below showers or bathtubs, around basement perimeters, behind or within basement walls, or the like. Such water detectors may identify leaks within plumbing or appliances within the property 104 or ingress of water into the property 104 (e.g., rain water, flooding, failing sump pump, foundation cracks, or the like). The smart energy platform 100 may collect alarm data from the smart alarms 930 and may perform automatic alerting based upon sensor events registered at such smart alarms 930 (e.g., alerting emergency services, homeowner, or the like, in an effort to protect life and property, mitigate damage, or such) or initiate automatic actions (e.g., shutting off water flow within the property 104, or within a particular segment of plumbing, via activating a smart water shut off valve, not separately shown).

Exemplary External Data Sources

In the exemplary embodiment, and referring now to FIG. 1, the smart energy platform 100 may collect various types of external data from external data sources 932 that may be used, for example, for evaluating energy usage at the property, or other various uses described herein. Some external data sources 932 may provide publicly available data, where other external data sources 932 may be private, third-party sources. External data sources 932 may include an insurance provider that provides insurance policies to the homeowner and various data available or otherwise collected by that insurance provider. In some embodiments, the hub 202 (shown in FIG. 2) may be operated by the insurance provider and the home health database may include data private to the insurance provider (e.g., customer data, policy information, or other proprietary information).

In the exemplary embodiment, one example external data source 932 is the NOAA or any of its various branches (e.g., the national weather service). The NOAA makes various weather data publicly available. As such, the smart energy platform 100 may collect weather data from the NOAA. Such weather data may be refined to a particular geography, such as a state, county, city, or other geographic region. The smart energy platform 100 may, for example, identify a geographic region of the property 104 and submit data queries to the NOAA for weather data specific to that geographic region. Such data queries may include requests for historical data such as average rainfall, storm occurrences, wind strengths, lightning strikes, temperatures, tornado events, or the like. Historical data may be used to, for example, evaluate future risks to the property 104 over time. Data queries may include requests for forecast data such as severe watches warnings, tornado watches or warnings, flooding watches or warnings, precipitation predictions, wind predictions, lightning event predictions, blizzard warnings, or the like. Forecast data may be used to, for example, generate and send weather alerts to the homeowner or occupants of the property 104 or determine how frequently the property 104 experiences various warnings or alerts over time.

In the exemplary embodiment, another example external data source 932 may be municipal power utilities. The smart energy platform 100 may access current or historical power network data provided by power utility companies in various localities, such as power generation performance statistics (e.g., generation and load statistics), power transmission and distribution statistics or power outage information (e.g., across the network, local to a distribution segment that services the property 104, consistencies of voltages, power sags, power surges, brown-outs or black-outs and associated frequencies or lengths of outages, or the like), lightning strike data affecting the power network, or electrical consumption data for the property 104 (e.g., current or historical power usage, local power generation provided back to the network). The smart energy platform 100 may use current power network data to, for example, generate and send alerts to the homeowner during power outages (e.g., as SMS text messages or emails that may be viewed on mobile computing devices), or as factors in home health scoring.

In the exemplary embodiment, another example external data source 932 may be third-party home data systems such as Multiple Listings Service ("MLS"), Zillow (www.zillow.com), or other Internet-accessible sources for property data. The smart energy platform 100 may access such home data systems to collect construction details about the property 104 such as, for example, the age of the home, how many bedrooms and bathrooms the property 104 has, the type of any HVAC, the square footage of the property 104, the size of the property, market price of the home, whether the property 104 is constructed of wood, brick, concrete, or the like, the type and size of any garage, the quality of materials used to construct the property 104, whether the property 104 has a basement, the type, age, or condition of plumbing or wiring inside and outside the property 104, whether the property 104 has a pool and safety fence around the pool, the type of roofing, the floor plan, the architecture of the property 104 (e.g., ranch, two story, split foyer), the type of flooring, the type of exterior (e.g., wood, brick, siding), type of local power generation on the property (e.g., solar, wind, generator), number of fire places, type of fencing or gutters, whether the property 104 has a pool, sheds, patios, porches, or other exterior structures, whether the property 104 has outside doors having steps, type of ducting and insulation within the property 104, type of landscaping around the property 104, or mobility or accessibility options within the property 104.

Some home statistics data may include geographic data about the property 104 such as, for example, school district information (e.g., public school system, school ratings), utility providers available to at the location (e.g., electric, gas, sewer, waste, recycling, phone, Internet, television, fire, police, hospital, or other city services), proximity data to various services and amenities (e.g., distances from schools, parks, grocery, gas, library, or sources of entertainment), hazard data for the area (e.g., crime statistics, natural disaster statistics, ratings for emergency services), Some home statistics data may include historical data, such as price history (e.g., sales history, listings history), public tax history, insurance claims history, home warranty information, home inspection information, lease information (e.g., whether and how often the property 104 has been partially or fully rented or leased), or the like. Some home statistics data may include home energy data such as, for example, whether the property 104 is energy certified, type and size of power generation, home appliance or lighting energy certification data, or the like.

In the exemplary embodiment, another example external data source 932 may be an insurance provider or other service provider that has an economic or consumer relationship with the homeowner. The smart energy platform 100 may access the service provider systems to collect demographic details about the property 104 and its occupants, such as, for example, names or ages of the occupants, education levels or occupations of the occupants, whether any of the occupants smoke, a family emergency plan, community engagement of the occupants, or whether a business is operated out of the property 104.

The service provider system may collect home maintenance data about the property 104 such as, for example, maintenance logs of operations performed on the property 104 (e.g., service calls, property damage and fixes, routine device maintenance, cleanings, bug or pest service, lawn or garden service, roofing replacement, or the like), equipment installations and removals, device warranty information, or home improvements (e.g., new deck, pool, room(s), interior or exterior painting or weather proofing, solar installation, water reclamation systems installation, room remodeling, or the like). The service provider system may collect home configuration data about the property 104 such as, for example, whether GFCI outlets or LED lights are installed in the property 104, whether power strips supporting multiple devices are in use, whether the property 104 has exercise equipment, types of grills or fryers installed in the property 104, whether the property 104 includes particular safety equipment (e.g., smoke or carbon monoxide detectors, fire extinguishers, deadbolts on exterior doors, water sensors, sump pump, or the like), paint colors used on various walls of the property 104.

In some embodiments, the service provider may be the operator of the hub 202 (shown in FIG. 2) and the homeowner may provide such data via an input interface (e.g., online questionnaire, user interface, service application, or the like, during participation in the home health system described herein). Collection and use of such data may be opted into by the homeowner on behalf of the occupants. In some embodiments, the smart energy platform 100 may query the homeowner for any data elements described herein and not otherwise automatically accessed by the smart energy platform 100.

In the exemplary embodiment, the smart energy platform 100 may access aerial data of the property 104, such as satellite-, aerial-, or drone-captured overhead images of the property 104 and surrounding property. Such aerial data may be used to determine various externally visible features of home data (e.g., via digital image processing, machine learning, or human analysis). For example, the smart energy platform 100 may use aerial data to determine structural elements of the property 104 or surrounding property, such as whether the property 104 has a swimming pool, a fence, or a deck, how many garages the property 104 has, or the like. The smart energy platform 100 may use aerial data to determine whether the property 104 has trees nearby (e.g., which may cause damage to the property 104) or whether the property 104 is located on a cul-de-sac or a busy road. Such aerial data may be provided by a third party or public external data source 932 (e.g., United States Geological Survey ("USGS"), National Aeronautics and Space Administration ("NASA"), NOAA, Google®, or the like) or may be privately collected (e.g., via aerial or drone photography of the property 104 by the insurance provider, realtor, or the like). Such aerial data may include global positioning system ("GPS") location data for the property 104.

The smart energy platform 100 may train a model of satellite images of properties 104 with labeled data of the properties 104 indicating, for example, whether the properties 104 have pools, decks, nearby trees, or other such features. As such, the trained model may be configured to automatically evaluate an unlabeled home (e.g., the property 104 in FIG. 1) to determine whether such features are present or otherwise categorize the property 104 with respect to those features.

In some embodiments, the smart energy platform 100 may access mapping data around the property 104 to determine various home health features. The smart energy platform 100 may utilize a web mapping service (e.g., Google® Maps or the like) as an external data source 932. For example, the smart energy platform 100 may access the web mapping service via an application programming interface ("API") that allows the smart energy platform 100 to submit, for example, the postal address of the property 104 or a GPS coordinate of the property 104 and query the web mapping service to provide features such as distances to nearby services (e.g., distance to nearest hospital, fire department, police station, schools, places of worship, parks, grocery stores, to various types of entertainment or other amenities, or the like). Mapping data may be used to determine whether the property 104 is situated on a busy or isolated road. The smart energy platform 100 may generate a play score for the property 104 using the mapping data, where the play score evaluates proximity of the property 104 to various types of entertainment or exercise venues, such as proximity to hiking trails, bike paths, sports fields, professional sports venues, restaurants, theaters, or the like).

The mapping data may include ground-level imagery provided by the web mapping service that may be used by the smart energy platform 100 to evaluate various externally visible features of home data (e.g., via digital image processing, machine learning, or human analysis). For example, the smart energy platform 100 may use ground-level imagery to determine structural features of the property 104 such as a number of stories of the home, type of windows installed in the home, a roof type or type of exterior of the home, or how many garages the home has. The smart energy platform 100 may train a model of ground-level images of properties 104 with labeled data of the properties 104 indicating, for example, how many stories or garages the properties 104 have, what type of exterior or roof type the properties 104 have, or other such features. As such, the trained model may be configured to automatically evaluate an unlabeled home (e.g., the property 104 in FIG. 1) to determine whether such features are present or otherwise categorize the property 104 with respect to those features.

EXEMPLARY EMBODIMENTS & FUNCTIONALITY

In one aspect, a smart energy platform for controlling energy consumption at a property may be provided. The smart energy platform may include a controller. The controller may include one or more processors, a memory device, and a plurality of sensors (and/or one or more transceivers, chat bots, and servers). The one or more processors may be programmed to: (i) receive an input from a user associated with the property indicating a maximum comfort temperature and a minimum comfort temperature of the property; (ii) receive property data indicating a size of the property; (iii) retrieve weather data indicating a weather condition for a location associated with the property; (iv) determine property usage indicating a presence of the user at the property; (v) receive energy pricing data for the location associated with the property from an energy company capable of providing energy to the location associated with the property; (vi) build a model based upon the received input from the user, the received property data, the retrieved weather data, and the property usage; (vii) input the received energy pricing data and the retrieved weather data into the model; (viii) output an energy schedule for the property, where the energy schedule maintains a temperature of the property within the maximum comfort temperature and the minimum comfort temperature at a minimum cost to the user; and/or (ix) control the temperature of the property using the plurality of sensors and an at least one heating, ventilation, and air conditioning (HVAC) unit based upon the energy schedule for the property. The smart energy platform may include additional, less, or alternate functionality, including that discussed elsewhere herein.

For instance, a further enhancement may be where the one or more processors are programmed to determine property usage based upon a presence schedule inputted by the user, location data associated with a user computer device of the user, and/or location data received from the plurality of sensors. An additional enhancement may be where the one or more processors are programmed to update the model based upon a change to one or more of the received input from the user, the received property data, the retrieved weather data, and the property usage.

A further enhancement may be where the one or more processors are programmed to receive solar generation data from at least one solar panel associated with the property indicating an amount of solar energy generated by the at least one solar panel. An additional enhancement may be where the one or more processors are programmed to: (i) input the received solar generation data into the model; (ii) output an energy schedule for the property, where the energy schedule is based upon the amount of solar energy generated by the at least one solar panel; and/or (iii) control the at least one solar panel based upon the energy schedule for the property, where the at least one solar panel may be controlled to use the generated solar energy in controlling the temperature of the property, store the generated solar energy in an energy storage system associated with the property, or send the generated solar energy back to an electric grid connected to the property.

A further enhancement may be where the one or more processors are programmed to determine the location associated with the property based upon location data associated with a user computer device of the user or on location data received from the plurality of sensors.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, chat, or voice bots, and/or sensors mounted in a property or on mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical estimates, weather history, weather temperature averages, property occupancy and/or actual electric energy usage costs. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the property, user, energy usage, weather, energy pricing, insurance policies, geolocation data, image data, sensor data, signal data, and/or other data.

Based upon these analyses, the processing element may learn how to identify characteristics and patterns that may then be applied to analyzing image data, model data, and/or other data. For example, the processing element may learn, with the user's permission or affirmative consent, to identify the temperature range at a property with which the property owner is comfortable. The processing element may also learn how to identify attributes of different weather types and temperatures, property occupancy, energy pricing, and times of day that make a user more or less likely to use energy at the property. This information may be used to control energy consumption at a property.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and may be implemented in a high-level procedural and/or object-oriented programming language, and/or in assembly/ machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium.

In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A smart energy platform for controlling energy consumption at a property, the smart energy platform comprising a controller including one or more processors, a memory device, a plurality of sensors, and at least one local power generation source located at the property, the one or more processors programmed to:

build a model for outputting an energy schedule for a described property based upon historical data for described properties, wherein the historical data includes historical local power generation data and historical property usage data including contextual conditions under which a user has historically been present at the property;

input current energy pricing data corresponding to a location of the property, current local power generation data received from the at least one local power generation source, and current contextual data corresponding to the contextual conditions into the model;

receive an energy schedule for the property output by the model in response to the input, the energy schedule specifying, over a predefined period, at least (i) an operating setting for an at least one heating, ventilation, and air conditioning (HVAC) unit and (ii) an operating setting for the at least one local power generation source, the energy schedule associated with a minimized predicted energy cost over the predefined period while maintaining a temperature of the property within a predefined maximum comfort temperature and a predefined minimum comfort temperature during periods in which the user is predicted to be present at the property; and control the at least one HVAC unit and the at least one local power generation source based upon the received energy schedule.

2. The smart energy platform of claim 1, wherein the plurality of sensors includes a smart thermostat.

3. The smart energy platform of claim 1, wherein the processors are further programmed to determine property usage based upon a user presence schedule inputted by the user.

4. The smart energy platform of claim 1, wherein the processors are further programmed to determine property usage based upon location data associated with a user computer device of the user.

5. The smart energy platform of claim 1, wherein the processors are further programmed to determine property usage based upon data received from the plurality of sensors.

6. The smart energy platform of claim 1, wherein the processors are further programmed to update the model based upon a change to one or more of the current energy pricing data, the current local power generation data, and the current contextual data.

7. The smart energy platform of claim 1, wherein the current local power generation data includes solar generation data from an at least one solar panel associated with the property indicating an amount of solar energy generated by the at least one solar panel.

8. The smart energy platform of claim 7, wherein the processors are further programmed to:

input the solar generation data into the model;

output an energy schedule for the property, wherein the energy schedule is based upon the amount of solar energy generated by the at least one solar panel; and control the at least one solar panel based upon the energy schedule for the property, wherein the at least one solar panel may be controlled to:

use the generated solar energy in controlling the temperature of the property;

store the generated solar energy in an energy storage system associated with the property; or send the generated solar energy back to an electric grid connected to the property.

9. The smart energy platform of claim 1, wherein the processors are further programmed to determine the location associated with the property based upon location data associated with a user computer device of the user.

10. The smart energy platform of claim 1, wherein the processors are further programmed to determine the location associated with the property based upon data received from the plurality of sensors.

11. A computer-implemented method of using a smart energy platform to control energy consumption at a property, the method implemented using a controller including one or more processors, a memory device, a plurality of sensors, and at least one local power generation source located at the property, the method comprising:

building a model for outputting an energy schedule for a described property based upon historical data for described properties, wherein the historical data includes historical local power generation data and historical property usage data including contextual conditions under which a user has historically been present at the property;

inputting current energy pricing data corresponding to a location of the property, current local power generation data received from the at least one local power generation source, and current contextual data corresponding to the contextual conditions into the model;

receiving an energy schedule for the property output by the model in response to the input, the energy schedule specifying, over a predefined period, at least (i) an operating setting for an at least one heating, ventilation, and air conditioning (HVAC) unit and (ii) an operating setting for the at least one local power generation source, the energy schedule associated with a minimized predicted energy cost over the predefined period while maintaining a temperature of the property within a predefined maximum comfort temperature and a predefined minimum comfort temperature during periods in which the user is predicted to be present at the property; and controlling the at least one HVAC unit and the at least one local power generation source based upon the received energy schedule.

12. The computer-implemented method of claim 11, wherein the plurality of sensors includes a smart thermostat.

13. The computer-implemented method of claim 11, wherein the method further comprises determining property usage based upon a user presence schedule inputted by the user.

14. The computer-implemented method of claim 11, wherein the method further comprises determining property usage based upon location data associated with a user computer device of the user.

15. The computer-implemented method of claim 11, wherein the method further comprises determining property usage based upon data received from the plurality of sensors.

16. The computer-implemented method of claim 11, wherein the method further comprises updating the model based upon a change to one or more the current energy pricing data, the current local power generation data, and the current contextual data.

17. The computer-implemented method of claim 11, wherein the current local power generation data includes solar generation data from an at least one solar panel associated with the property indicating an amount of solar energy generated by the at least one solar panel.

18. The computer-implemented method of claim 17, wherein the method further comprises:

inputting the solar generation data into the model;

outputting an energy schedule for the property, wherein the energy schedule is based upon the amount of solar energy generated by the at least one solar panel; and controlling the at least one solar panel based upon the energy schedule for the property, wherein the at least one solar panel may be controlled to:

use the generated solar energy in controlling the temperature of the property;

store the generated solar energy in an energy storage system associated with the property; or send the generated solar energy back to an electric grid connected to the property.

19. The computer-implemented method of claim 11, wherein the method further comprises determining the location associated with the property based upon location data associated with a user computer device of the user.

20. The computer-implemented method of claim 11, wherein the method further comprises determining the location associated with the property based upon data received from the plurality of sensors.

21. At least one non-transitory computer-readable storage medium having computer-executable instructions embodied thereon, wherein when executed by one or more processors of a controller of a property, the computer-executable instructions cause the one or more processors to:

build a model for outputting an energy schedule for a described property based upon historical data for described properties, wherein the historical data includes historical local power generation data and historical property usage data including contextual conditions under which a user has historically been present at the property;

input current energy pricing data corresponding to a location of the property, current local power generation data received from at least one local power generation source, and current contextual data corresponding to the contextual conditions into the model;

receiving an energy schedule for the property output by the model in response to the input, the energy schedule specifying, over a predefined period, at least (i) an operating setting for an at least one heating, ventilation, and air conditioning (HVAC) unit and (ii) an operating setting for the at least one local power generation source, the energy schedule associated with a minimized predicted energy cost over the predefined period while maintaining a temperature of the property within a predefined maximum comfort temperature and a predefined minimum comfort temperature during periods in which the user is predicted to be present at the property; and control the at least one HVAC unit and the at least one local power generation source based upon the received energy schedule.

* * * * *